United States Patent
Levin et al.

(10) Patent No.: US 8,063,380 B2
(45) Date of Patent: Nov. 22, 2011

(54) SEMICONDUCTOR CRYSTAL HIGH RESOLUTION IMAGER

(75) Inventors: Craig S. Levin, Palo Alto, CA (US); James Matteson, San Diego, CA (US)

(73) Assignees: The Board of Trustees of the Leland Stanford Junior University, Stanford, CA (US); The Regents of the University of California, Oakland, CA (US)

( * ) Notice: Subject to any disclaimer, the term of this patent is extended or adjusted under 35 U.S.C. 154(b) by 713 days.

(21) Appl. No.: 11/662,870

(22) PCT Filed: Sep. 30, 2005

(86) PCT No.: PCT/US2005/035203
§ 371 (c)(1),
(2), (4) Date: Apr. 10, 2007

(87) PCT Pub. No.: WO2006/039494
PCT Pub. Date: Apr. 13, 2006

(65) Prior Publication Data
US 2008/0042070 A1    Feb. 21, 2008

Related U.S. Application Data

(60) Provisional application No. 60/614,799, filed on Sep. 30, 2004.

(51) Int. Cl.
*G01T 1/24* (2006.01)
(52) U.S. Cl. .................................. 250/370.13
(58) Field of Classification Search .............. 250/361 R, 250/362, 363.03, 363.04, 363.05, 370.01, 250/370.11, 370.12, 370.13, 370.14, 371
See application file for complete search history.

(56) References Cited

U.S. PATENT DOCUMENTS

| | | | |
|---|---|---|---|
| 4,672,207 A | 6/1987 | Derenzo | |
| 5,009,128 A | 4/1991 | Seidel et al. | |
| 5,091,650 A | 2/1992 | Uchida et al. | |
| 5,378,894 A | 1/1995 | Akai | |
| 6,002,134 A * | 12/1999 | Lingren | 250/370.01 |
| 6,114,703 A | 9/2000 | Levin et al. | |
| 6,169,287 B1 | 1/2001 | Warburton | |
| 6,245,184 B1 | 6/2001 | Riedner et al. | |
| 6,399,951 B1 | 6/2002 | Paulus et al. | |
| 6,583,420 B1 * | 6/2003 | Nelson et al. | 250/397 |
| 6,621,084 B1 * | 9/2003 | Wainer et al. | 250/370.09 |
| 7,049,600 B2 | 5/2006 | Levin | |
| 2002/0190214 A1 | 12/2002 | Wieczorek et al. | |
| 2004/0124360 A1 | 7/2004 | Levin et al. | |
| 2004/0251419 A1 * | 12/2004 | Nelson et al. | 250/370.09 |

OTHER PUBLICATIONS

Levin, C., "Initial Studies of a New Detector Design for Ultra-High Resolution Positron Emission Tomography," Nuclear Science Symposium Conference Record, IEEE, p. 1751-55 (Nov. 2002).
Levin, C., "Design of a High Resolution and High Sensitivity Scintillation Crystal Array with Nearly Perfect Light Collection," Nuclear Science Symposium Conference Record, IEEE, p. 48-52 (2002).
Shah et al., "ADP Designs for X-Ray and Gamma Ray Imaging," 2001 IEEE Nuclear Science Symposium.

* cited by examiner

*Primary Examiner* — Mark R Gaworecki
(74) *Attorney, Agent, or Firm* — Greer, Burns & Crain Ltd.

(57) ABSTRACT

A radiation imaging device (10). The radiation image device (10) comprises a subject radiation station (12) producing photon emissions (14), and at least one semiconductor crystal detector (16) arranged in an edge-on orientation with respect to the emitted photons (14) to directly receive the emitted photons (14) and produce a signal. The semiconductor crystal detector (16) comprises at least one anode and at least one cathode that produces the signal in response to the emitted photons (14).

35 Claims, 22 Drawing Sheets

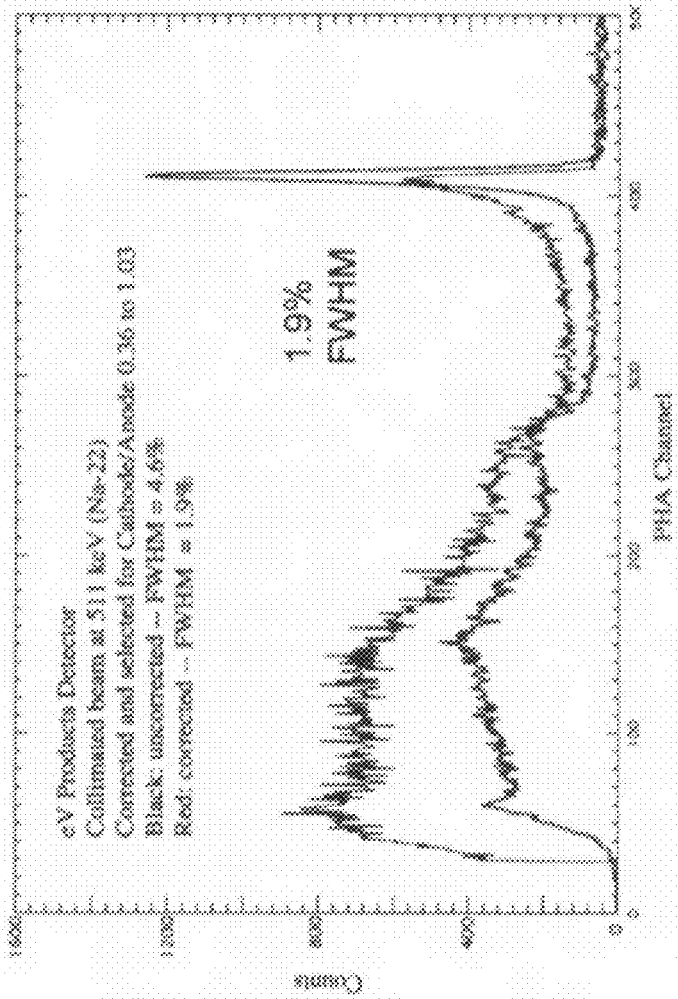
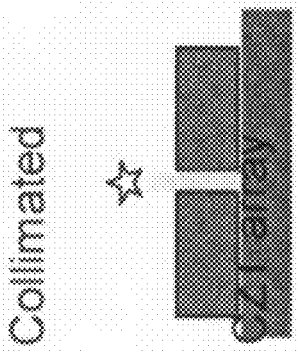
FIG. 7A

SEMICONDUCTOR CRYSTAL HIGH RESOLUTION IMAGER

PRIORITY CLAIM

This application claims the benefit of U.S. Provisional Application Ser. No. 60/614,799, filed Sep. 30, 2004, under 35 U.S.C. §119.

STATEMENT OF GOVERNMENT INTEREST

This invention was made with government support under Grant No. NASA NAG5-5349 awarded by The National Aeronautics and Space Administration (NASA). The government has certain rights in the invention.

TECHNICAL FIELD

A field of the invention is high resolution radiation imaging. An exemplary application of the invention is a positron emission tomography (PET) device.

BACKGROUND ART

Scintillation crystals have conventionally been used in non-invasive medical diagnostic techniques that utilize radiation-emitting materials. One such technique is positron emission tomography (PET), which provides in-vivo, functional information about the molecular biochemistry of a given radio-labeled compound (tracer) introduced into a live subject. The radio-label is a positron emitter, which results in high energy photon emissions when positrons annihilate with electrons in body tissue. The tomographic imaging is possible through detection and localization of the many associated highly energetic photons emitted.

In conventional PET, the photons are absorbed in a scintillation crystal, which gives off a flash of light. The light is collected by a photodetector, which detects and converts the light into electric charge that is amplified. The result is a robust electric signal with an amplitude that represents the energy of the incoming photon, a location that indicates where the energetic photon came from within the imaging subject, and a time stamp that signifies when the event occurred. For high spatial resolution imaging, which will allow one to see very minute structures, conventional PET relies on very accurate localization of the energetic photon emissions. This means that the scintillation detector must have very fine position resolution of the entering photons. However, to efficiently absorb the incoming photons, the crystal must also be relatively thick. Efficient absorption of incoming photons is important to allow for high count sensitivity, which translates into good image quality. Further, the signals that are created should be as robust as possible.

The state of the art was advanced by the invention described in U.S. Pat. No. 6,114,703 to Levin et al. The '703 patent provided an efficient method and devices for collection, and made the large surfaces of long and narrow scintillation crystals available for detection. The '703 patent disclosed methods and devices that replaced the bulky and expensive photomultipliers (PMTs) by utilizing semiconductor photodetectors, applying such semiconductor photodiodes directly to surfaces of the scintillation crystals, including at least one large surface of the scintillation crystal. The device of the '703 patent improved the amount of light measured from a scintillation event, while maintaining high spatial resolution offered by long and narrow scintillation crystals. The '703 patent also improved upon the single sheet style conventional devices that receive radiation in the large face of the crystal sheet by eliminating the coupling losses associated with the optical interfaces between the crystal and PMT and replacing the PMT of the conventional devices with directly deposited semiconductor photodiodes.

An overriding goal in radiation imaging is to obtain reconstructed images of very high spatial resolution. Spatial resolution improvements in reconstructed images have come most often from reductions in the size and increases in the number of scintillation crystals. Detection sensitivity, though, is another limiting factor. The '703 patent was directed to improvements in the detection sensitivity. To maintain high detection sensitivity and good image quality, the challenges were to develop a finely pixellated scintillation crystal array with both high detection efficiency and high light collection. High detection efficiency means the crystals must be relatively long, tightly packed, and cover a relatively large axial field-of-view (FOV). High spatial resolution means that the crystals are very narrow.

A difficulty with designs having small scintillation crystals for high resolution is that manufacturing is a significant challenge. It is costly and complex to handle many minute crystal elements and align them with corresponding photodetector elements. Slight misalignments might reduce light collection efficiency. A shortcoming with conventional crystal sheet devices for PET is that the sheet must be thin so that it produces a relatively narrow beam of light onto the photodetector plane. Thus, crystal sheet detectors (e.g. coincidence gamma ray cameras) that have been used in PET suffer from low efficiency for stopping the high energy photons.

A prior application Ser. No. 10/664,768, now published as US-2004-0124360-A1, filed Sep. 17, 2003 (the '768 application) provides additional background for the present invention. The '768 application discloses, among other things, scintillation crystal sheets arranged in stacks parallel to each other. Semiconductor photodetector positional detectors read light from large faces of the scintillation crystal sheets to detect interactions in the scintillation crystal sheets and independently provide positional information concerning the interactions relative to two axes.

A preferred embodiment in the '768 application includes an array of scintillation crystal sheets arranged in a device such that radiation is incident upon small end faces of the sheets ("end face geometry" or "edge-on" geometry), and is fully described in the '768 application. Semiconductor photodiodes read light from large faces of the crystal sheets. The semiconductor photodiodes in the '768 application may be pixellated, meaning that the semiconductor diodes provide both detection of photons generated in the scintillation crystals and positional information about a detection, or may be, one large pixel with positioning capability within that pixel. In another preferred embodiment of the '768 application, radiation is incident on a large face of scintillation crystals ("large face geometry" or "face-on geometry").

DISCLOSURE OF THE INVENTION

Preferred embodiments of the present invention provide a radiation imaging device. The radiation image device comprises a subject radiation station producing photon emissions, and at least one semiconductor crystal detector arranged in an edge-on orientation with respect to the emitted photons to directly receive the emitted photons and produce a signal. The semiconductor crystal detector comprises at least one anode and at least one cathode that produces the signal in response to the emitted photons.

A preferred method for radiation imaging is also provided. A plurality of semiconductor crystal detectors are provided, which are oriented edge-on with respect to a subject radiation station. Each of the semiconductor crystal detectors comprises a semiconductor crystal, at least one anode disposed on a large face of the crystal, and at least one cathode disposed on an opposing large face of the crystal. Emitted photons are directly received from the subject radiation station by the semiconductor crystal detectors, so that the semiconductor crystal directly absorbs the emitted photons. The at least one anode and cathode produce electric pulses sufficient to determine a position of the emitted photons.

BRIEF DESCRIPTION OF THE DRAWINGS

FIG. 7A shows Na 511 keV pulse height spectra measured in a 5 mm thick eV Products CZT detector array irradiated with collimated irradiation of photons;

BEST MODE OF CARRYING OUT THE INVENTION

Figure 1:
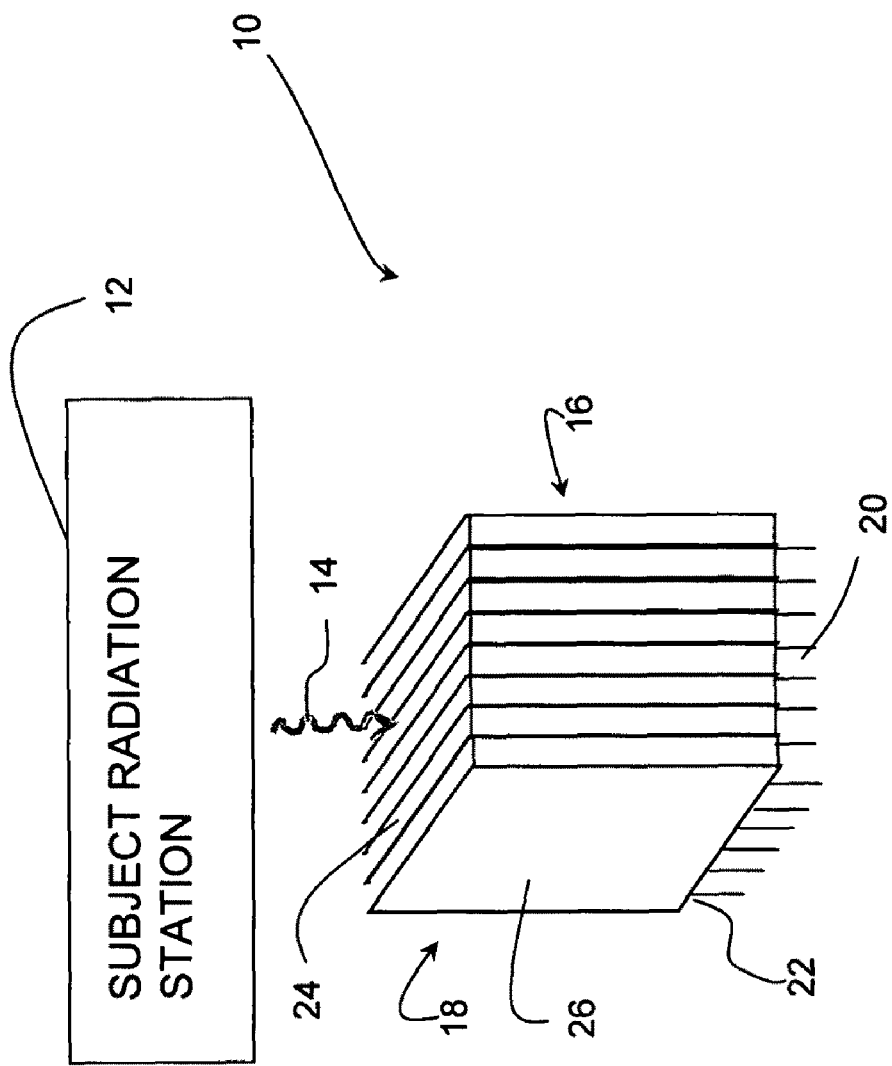
FIG. 1 shows an exemplary radiation imaging device, including an array of semiconductor detection crystals, according to an embodiment of the present invention.

Preferred embodiments of the present invention provide, among other things, a radiation imaging device that includes a subject radiation station producing photon emissions, and a semiconductor crystal detector that is arranged to directly detect the emitted photons from the radiation station and produce electric pulses. As opposed to conventional radiation imaging such as used in conventional PET, a scintillation crystal is not necessary. This allows direct, and more efficient, conversion of the emitted photons into an electrical signal as compared to scintillation-based detectors.

The crystal detectors are made from a high-density, high atomic number (z) semiconductor. Such semiconductors are selected from materials that are able to provide the necessary absorption of 511 keV photons for high-quality imaging. In a preferred embodiment, the semiconductor Cadmium-Zinc-Telluride (CZT) is used, though other high-z semiconductors may be used, including but not limited to mercuric iodide, high-purity germanium, etc. These and other preferred semiconductor materials allow absorption of the incoming photons, and create signals that are sufficiently robust for quality imaging.

Though a high-z semiconductor material is used, the z and density may be lower than, say, a conventional organic scintillation crystal. Thus, a single wafer may be insufficiently thick for necessary absorption of high energy photons. Due to the energy of the incoming photons, it is important that the thickness of the crystal that is encountered by the photons be as great as possible. As a non-limiting example, it is desired that 90-95% or higher of the incoming photons be absorbed by the crystal. Based on the energy of the photons and the linear attenuation coefficient of the particular semiconductor material, a particular needed thickness can be determined.

For CZT, for example, it is desired that the semiconductor crystal be at least 4 cm thick to efficiently absorb 511 keV photons. However, it is impractical to form CZT crystals having such a thickness, it would be difficult to create a high electric field across such devices, and such crystals could produce undesirable charge loss or leakage current effects. Impurities and defects are present in semiconductor crystals, and the longer electrons and holes have to drift before collection, the more likely they will become attached to the impurities and defects.

To address the thickness concern, and allow optimal use of semiconductors such as CZT, the semiconductor crystals preferably are arranged or oriented to be edge-on with respect to incoming photons. By "edge-on", it is intended that the semiconductor crystals are arranged such that the incoming photons first encounter the edge of a given crystal plate, as opposed to first encountering the face of the crystal plate (face-on). Incoming photons impinging edge-on on a stack of these crystal plates will, on average, encounter a minimum thickness equal to the plate width of the crystal. This edge-on arrangement allows the incoming photons to encounter as much of the semiconductor material as physically possible, by making the crystal dimension traversed by the photons as great as possible.

A semiconductor crystal, such as a CZT crystal, arranged edge-on with respect to incoming 511 keV photons, can achieve superior 511 keV photon detection efficiency, which leads to significantly increased image counts. The direct conversion of the 511 keV photon energy into charge allows CZT to achieve excellent energy resolutions (~2-3% for 511 keV photons), which helps to significantly reduce random and scatter coincidence background compared to scintillation crystal-based systems for enhanced image data quantification and image contrast resolution. The semiconductor material and edge-on arrangement may also, for example, allow for correction for impurities in the material, so that less expensive materials may be used. The use of a relatively new, cost-effective CZT detector array material, limited electronic complexity, and commercially available readout electronics limits the development costs of a traditionally expensive detector technology.

Semiconductor crystal detectors may include an electrode configuration that is either pixellated or a cross-strip arrangement. The pixellated or cross-strip arrangement, for example, facilitates 3-D event localization. Spatial resolution can be determined by the electrode strip configuration deposited onto the semiconductor surfaces, which for CZT, can be <1 mm without significant difficulty. This electrode-determined pixellation makes manufacturing ultra-high resolution detectors much easier. Standard scintillation detectors, by contrast, have only 2-D event localization, and ultra-high resolution requires cutting and packing together miniscule (<1 mm) scintillation crystals, which is very complex and costly.

The preferred 3-D photon interaction localization facilitates interaction depth resolution (<5 mm), allowing a system with a smaller FOV (e.g., 8 cm) to significantly boost coincidence detection efficiency (~20%), while preserving spatial resolution uniformity (e.g., for a 20° angle of incidence, photon interaction depth resolution blurring is <1.0 mm throughout). Typical scintillation crystal-based small animal PET systems, on the other hand, cannot resolve photon interaction depth, and require a relatively large circle of detectors (to mitigate parallax error) that yields only 2-3% coincidence detection efficiency (less photons detected per time). Their volumetric spatial resolution is good at the center but worse (>20 mm$^3$) at larger radial positions within the typically cylindrical-shaped system.

Individual crystals in the preferred crystal array are preferably stacked and arranged with respect to the subject radiation station with very small gaps and >99% crystal packing fraction. For example, the semiconductor crystal array may be arranged in a ring shape, a plate shape, or box shape about the subject radiation station. Particular preferred arrangements promote an order of magnitude higher 511 keV photon detection efficiency compared to scintillation-based cylindrical designs, which have a relatively large diameter, short crystals, and larger and varying gaps that lower crystal packing fraction. Combined improvements in detection efficiency and spatial and energy resolutions translate directly into a log order increase in molecular probe sensitivity compared to scintillation crystal systems that are available.

In preferred embodiments, new methods may be provided to accurately position photons that have scattered in the detector gantry. This is not possible with scintillation crystal systems, because the detectors have multiple array crystals multiplexed to one PMT.

Additionally, preferred methods use CZT signals to correct the CZT time stamp to improve coincident time resolution using the known dependence of signal rise with interaction location within a detector. This is not possible with light signals generated in scintillation crystal since light signal propagation within the crystal is so rapid.

Referring now to the drawings, a preferred embodiment PET device is shown 10. A subject radiation station 12 of the device is conventional, and is not illustrated in detail. The subject radiation station 12, for example, may be similar to commercial PET devices, such as those manufactured by GE and Siemens. The subject radiation station 12 produces photon emissions 14 that are detected by a semiconductor crystal detection array 16. The detection array includes a plurality of semiconductor crystal detectors having crystal wafers or plates 18, and a plurality of leads 20 extending from a bottom edge 22 of the plates. As shown, the plates 18 are stacked to form layers, and the array 16 is arranged with respect to the incoming photons 14 in an edge-on orientation such that the photons encounter a top edge 24 of the plates 18.

The semiconductor crystal plates 18 are made from semiconductor material, such as Cadmium-Zinc-Telluride (CZT), in which the emitted photons 14 interact with to create electrons and holes. For the crystal plates 18, a very high resistivity material is preferred, so that a large electric field may be applied without excess leakage current. The crystal 18 preferably is high-resistance yet as uniform as possible, in that it should be as free as possible from defects and impurities.

Generally, an electric field is created that is perpendicular to the large face 26 of the plates. The created holes drift parallel to the field, as does the resulting current. A resulting current spike is induced in anode and cathode electrodes disposed on the plates 18. Thus, due to the edge-on arrangement of the plates 18, the incoming photons 14 enter the edge that is parallel to the direction of the current created, as opposed to a typical detection crystal arrangement in which the photons enter a face that is perpendicular to the current direction. The current spikes (pulses) provide signals, which preferably are amplified, digitized, and stored and/or analyzed. The particular plates 18 that are hit by the photons, as well as the particular electrodes hit, provide X, Y, and Z position coordinates for the incoming photons 14. A ratio between the anode and cathode electrodes signals or measuring the time difference between arriving anode and cathode signals (TAC) provides a Z position coordinate (in the direction going from anode to cathode).

The crystal plates 18 provide position sensitive detectors for the PET device that absorb the emitted photons 14 directly rather than through the extra energy conversion step involving scintillation crystals. The position sensitive semiconductor crystal detectors (plates 18) are preferably placed in the edge-on configuration to facilitate high photon absorption efficiency. An important advantage of direct detection semiconductor detectors is that all of the incoming photon energy is converted directly into an electric signal in the semiconductors themselves rather than relying on the scintillation light conversion step, which is relatively inefficient. This allows a larger basic electronic signal and better energy resolution, in principle. Also, very fine spatial resolution can be realized using standard techniques for fabricating the relevant electrodes for the semiconductor detector arrays. This could help to further push the resolution limits of PET or other radiation imaging techniques.

The edge-on configuration allows the photons to traverse a relatively large length of the semiconductor. This is crucial for high absorption efficiency, since typically a direct absorption semiconductor would have a lower atomic number and density than organic scintillation crystals, and thus have less absorptive power for the incoming photons 14. 4 cm wide CZT arranged edge-on with respect to incoming photons, for example, would provide adequate absorption efficiency for 511 keV photons in PET. If oriented in the conventional face-on configuration, many position sensitive semiconductor arrays would have to be stacked together to provide adequate detection efficiency, since the devices are relatively thin in the face-on direction. This would be inefficient, and may also have complex manufacturing and electrical readout issues.

The electronic leads 20, extending from electrodes on the position-sensitive semiconductor crystal 18, provide bias and readout for each crystal. As shown in FIG. 1, the leads 20 extend from the bottom edge 22 rather than the backside, which is the standard technique. With this configuration, the leads 20 do not get in the way and do not require significant gaps between semiconductors that would reduce photon absorption efficiency.

It is preferred that the position-sensitive semiconductor plates 18 are placed in very close proximity to each other within the stack 16. In this way, a barrier separating each plate 18 needs to be minimal or preferably non-existent in order for there not to be significant gaps between detection planes for high crystal packing fraction, optimal photon absorption efficiency, and high sampling of the radiation distribution. If a barrier is used, however, an exemplary barrier is an electrically insulating layer, with or without embedded electrical traces. To read out the signals from each electrode in this densely packed arrangement, preferably, the leads 20 are coupled to an ASIC pre-amp, amplifier, and trigger chip, and then to a digitizer and controller. The position of the leads 20 (extending from the bottom edge 22) allows the plates 18 to be stacked closely and arranged edge-on with respect to incoming photons 14, which permits readout of signals from the electrodes.

Figure 2:
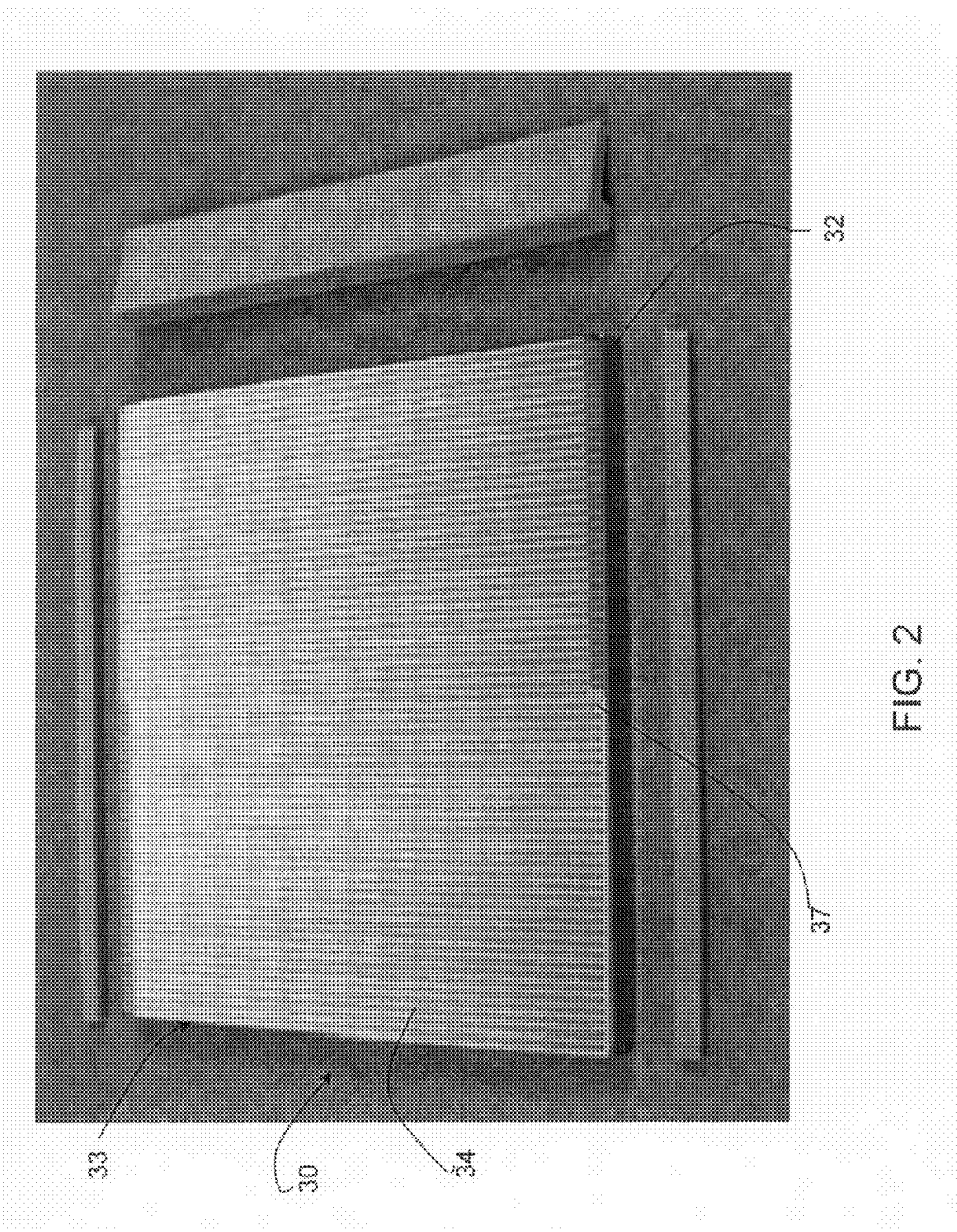
FIG. 2 shows an exemplary cross-strip CZT plate, according to a preferred embodiment of the present invention.
Figure 3:
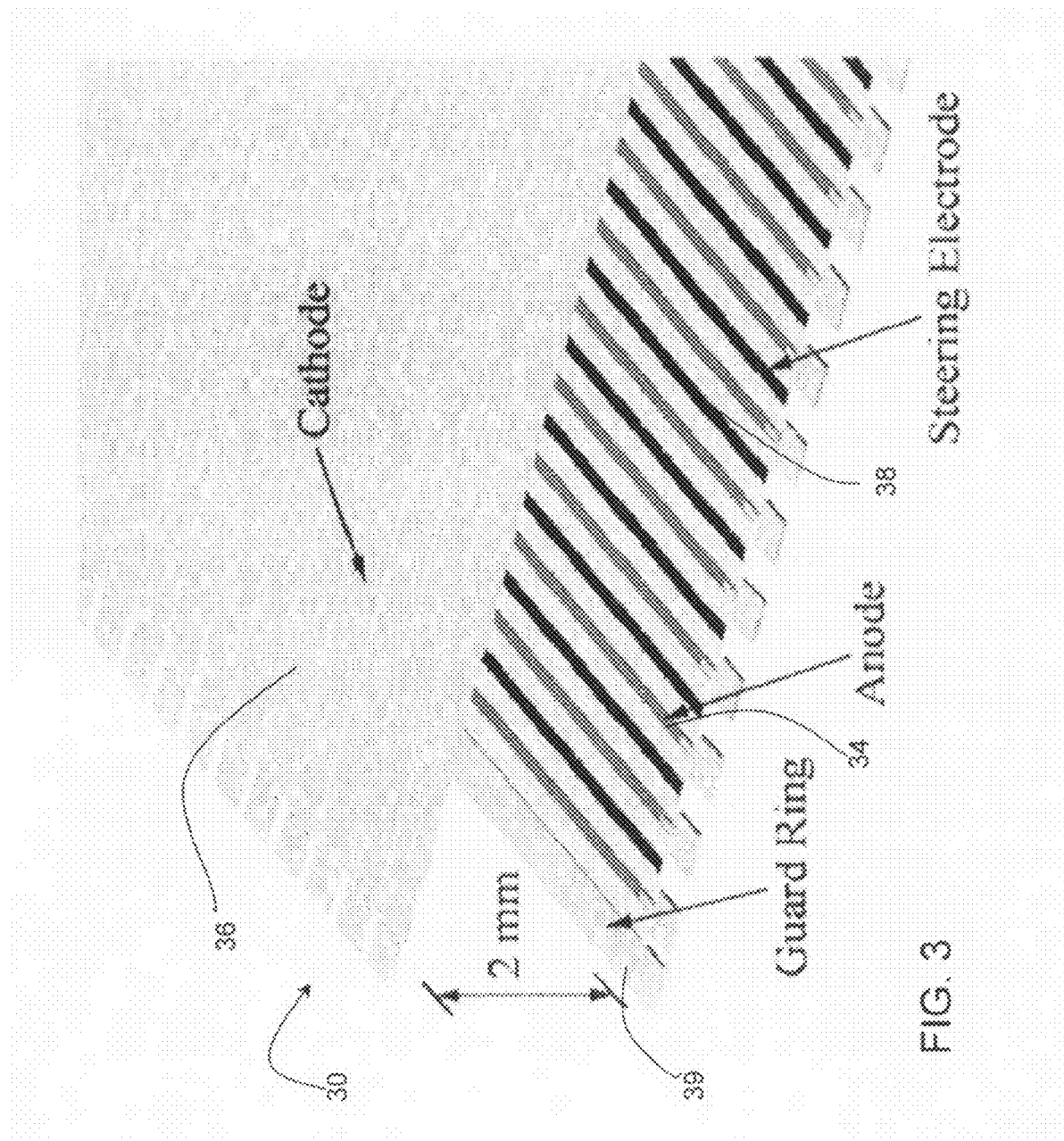
FIG. 3 is a schematic view of the cross-strip CZT plate.

FIGS. 2-3 depict an exemplary "cross-strip" single-crystal CZT detector plate 30. The plate 30 comprises a 32 mm×32 mm×2 mm thick CZT wafer 32 with a crossed-strip electrode pattern 33 deposited on its large face surfaces that includes anode strips 34 on the bottom of the wafer and cathode strips 36 on the top oriented perpendicular to the anodes. The electrodes in the detector plate 30 may be any of various conductive materials that will adhere to the large faces of the plate. The electrode pattern determines the interaction position of the incoming photons 14 encountered. The deposited pattern thus includes specific electrode size, width, and pitch. In preferred embodiments for use in PET, the anode strips 34 are very narrow (as a non-limiting example, 50 µm wide traces), and the cathode strips 36 are relatively much wider (as a nonlimiting example, 10-100 times wider). The wider cathode strips 36 allow, for example, improved signal timing characteristics. However, for photon detection other than PET, it may be preferred that the anode and cathode strips 34, 36 be of similar or equal size.

In the plate 30 shown (anode side up in FIG. 2), there are 64 anode+64 cathode strips (128 electronic channels per array). The electrodes 34, 36 are placed on the exemplary CZT wafer 32 with a 0.5 mm pitch and the crossed-strip configuration yields 0.5×0.5=0.25 mm² pixels. In an alternative embodiment, a larger strip pitch can be implemented to significantly reduce the number of electronic readout channels (and therefore complexity and cost) required. In other alternative embodiments, to reduce the number of strips, a fine anode and cathode strip pitch may be used, but adjacent strips may be connected together to effectively obtain the desired larger strip pitch via the resulting subgroups of strips.

There is roughly a 1 mm dead area 37 surrounding the perimeter of each array. One of the advantages of an edge-on orientation is that this dead area will not affect inter-module packing fraction. Additional "steering" electrodes 38 at a 500 µm pitch are placed in between the anode strips 34 to shape the local electric field between anodes favorably for best charge collection, by steering the charge toward the anodes. The components above, below, and to the right of the array are "zebra" strips that are used to connect both anode and cathode to readout circuitry. A guard ring 39 disposed about the edge of the crystal 30 makes the field uniform about the edge.

The anodes 34 collect the charge for pulse height analysis and X-position, while the cathodes 36 provide the Y-position and timing signal for the event. The event position can be assigned to the anode 34 with the largest signal or a weighted mean or other analysis of individual anode strip signals can be performed to obtain an intrinsic spatial resolution higher than the strip pitch. Anode sensitivity to hole signals is minimized by exploiting the "small pixel effect" in a strip electrode configuration by using narrow anodes. Thus, the detector plate 30 can provide a selectable spatial resolution, based on the pattern of the electrodes 34, 36 and the distance between traces. This resolution in preferred embodiments can be made much higher than available to conventional scintillation crystals.

Figure 21:
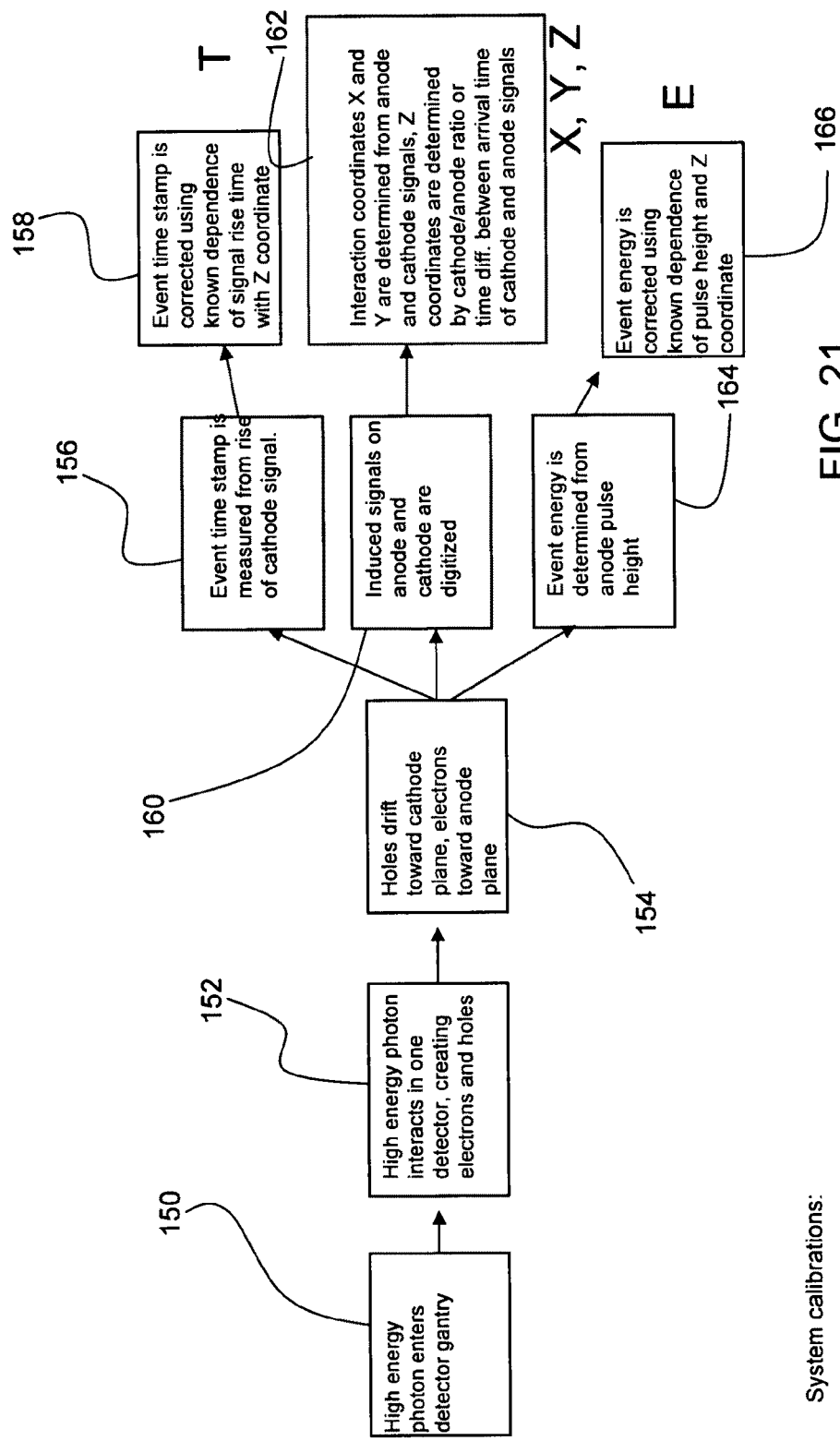
FIG. 21 shows steps in an exemplary imaging method.

An exemplary method for providing time, position, and energy using the exemplary semiconductor crystal detectors 30 is shown generally in FIG. 21. A high energy photon enters a detector gantry holding the detectors 30 (step 150), and the photons interacts in at least one of the detectors, creating electrons and holes (step 152). The holes drift toward the plane on which the cathodes 36 are deposited (step 154) and the electrons drift toward the plane on which the anodes 34 are deposited.

To determine a time of photon interaction, an event time stamp is measured from a rise of the cathode signal (step 156). The event time stamp is corrected using a known dependence of the signal rise time or other time-dependent signal properties with Z-(interaction depth) coordinates (step 158). To determine the Z-coordinate, the induced signals on the anode 34 and cathode 36 are digitized (step 160). Interaction coordinates X and Y are determined from the anode and cathode signals, and the Z-coordinates are determined either by the cathode-to-anode pulse height ratio, or the time difference between the arrival of the cathode and anode pulses (step 162).

Event energy is determined from anode pulse height (step 164). The event energy is corrected using a known dependence (e.g., via system calibration) of pulse height and the determined Z-coordinate (step 166).

Figure 4:
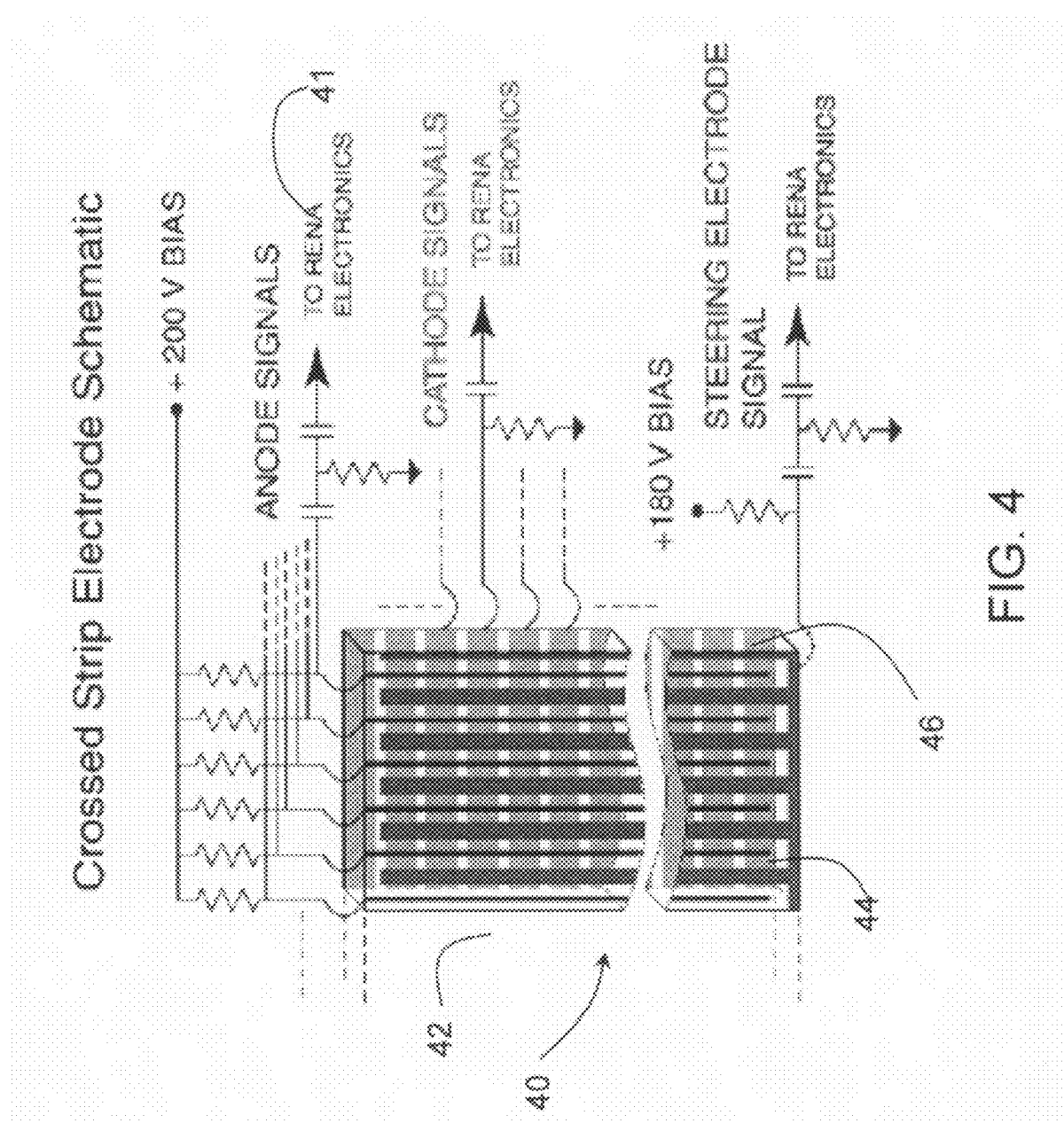
FIG. 4 is a schematic view of exemplary electrical connections for the cross-strip CZT plate.
Figure 5:
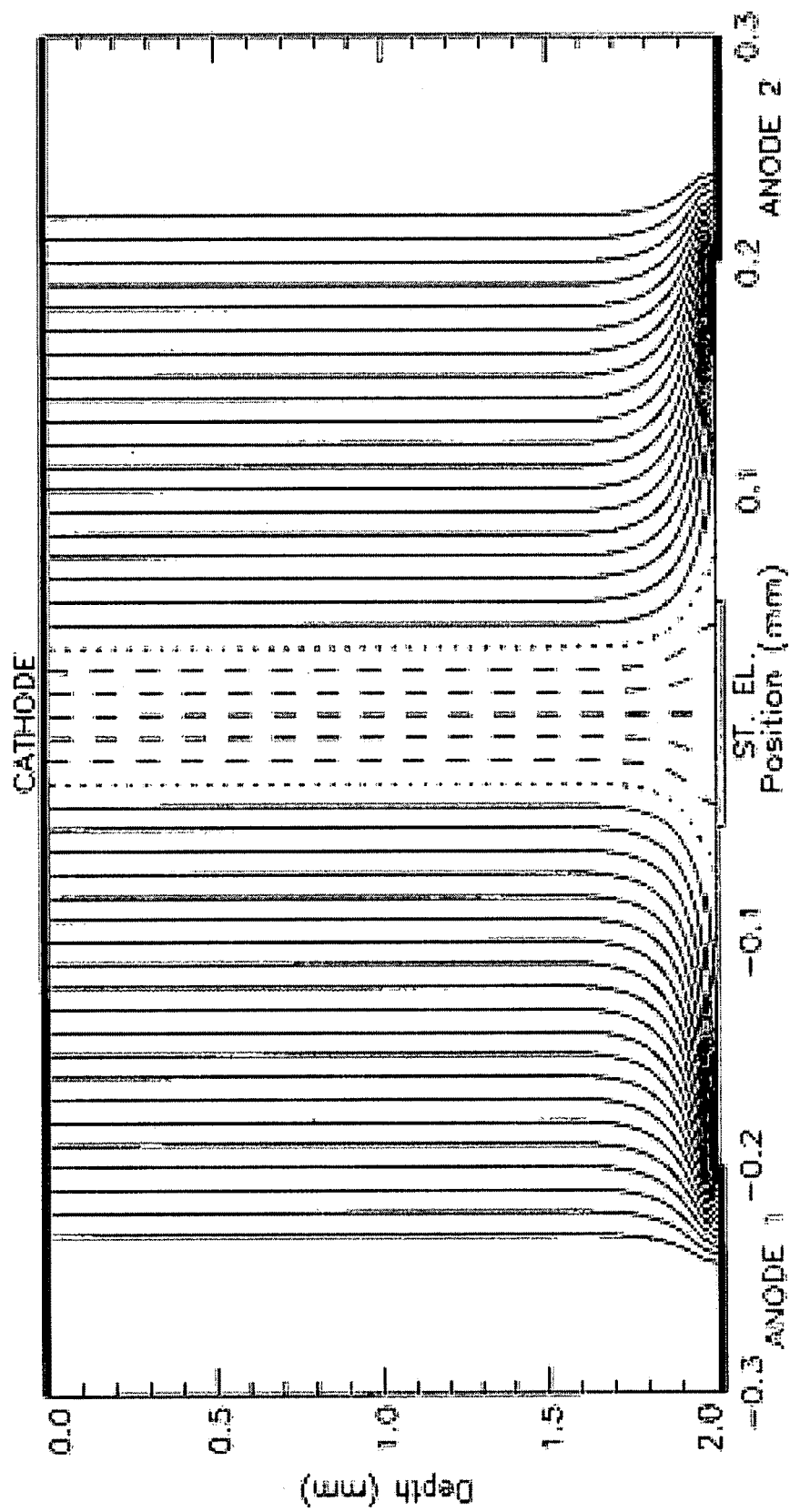
FIG. 5 shows calculated electric field lines terminating at anodes (solid lines), steering electrodes (dashed lines) and cathodes (dotted lines) of the cross-strip CZT plate of FIG. 3.
Figure 6:
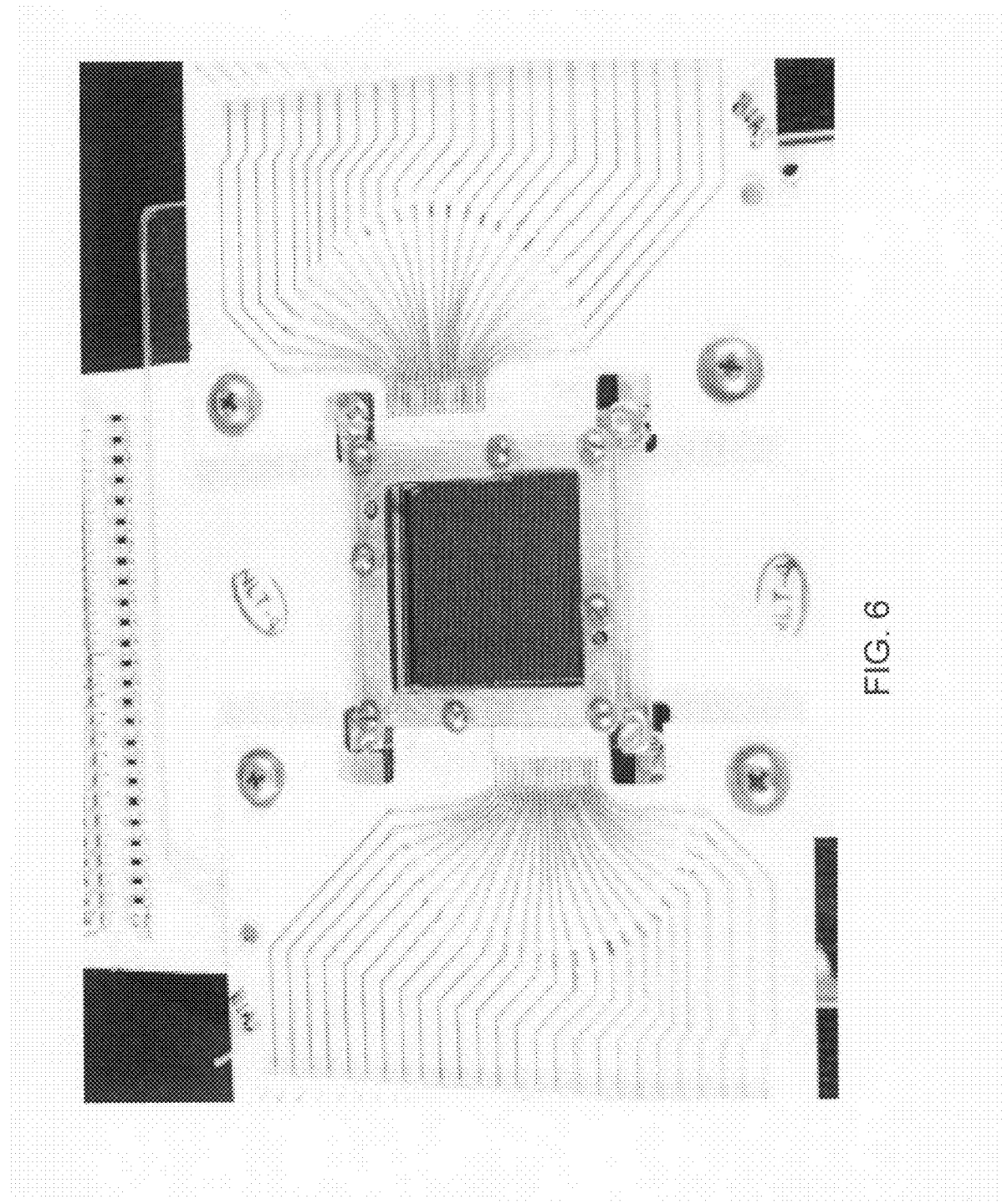
FIG. 6 shows an exemplary mounted CZT detector in a fan-out carrier board for coupling to readout electronics.

FIG. 4 shows an exemplary cross-strip CZT detector 40 coupled to readout electronics 41. FIG. 6 shows the detector 40 mounted in a fan-out carrier board for coupling to the electronics 41. An exemplary design uses 40×40 mm² cross-strip CZT wafer. Anodes 42 are 50 µm wide, shown as narrow vertical bands in FIG. 4. Steering electrodes 44, for example, 200 µm wide are interspersed between (spaced 100 µm from) the anode strips 42 to concentrate the anode weighting potential close to the anodes. FIG. 5 shows the model calculated results for electrostatic field lines for the strip configuration.

The electrostatic equipotential surfaces are perpendicular to the electric field lines shown. The steering electrodes 44, which are all connected to each other and are biased slightly (~10%) lower than the anode potential, also shape the field to improve charge collection by minimizing charge losses to the gaps between electrodes. These electrodes guide the signal charge drifting in the gap region away from the gap toward the anodes.

The cathodes 46 are indicated as horizontal bands and, in the exemplary detector 40 shown are 400 µm wide and separated by 100 µm. In one preferred design, the cathode strips 46 will be ~4.95 mm wide on a 5 mm pitch. Because of the relative size of the cathodes 46 and anodes 42, the cathode signals are induced as soon as the charge is created. Thus, the cathode signals are used for event timing. The cathode side is maintained n ear ground potential.

With the cross-strip electrode configuration, such as that shown in the cross-strip plate 30, the depth of interaction Z between the anode 34 and cathode 36 is strongly correlated to the ratio of the cathode to anode pulse height, and also on the time difference between the arrival of the anode and cathode signals. This relationship is important, since it gives the Z position for the event. For photon interactions that occur closer to the top (cathode side) of the detector, more electron trapping can occur. This causes the anode charge collection, and therefore the energy signal, to be depth dependent. Intrinsic variations in electron transport throughout a detector can be calibrated in every pixel versus depth. Thus, differences in detector quality (e.g. impurity levels) can be tolerated in the small-pixel or cross-strip detectors compared to other more common detector designs. For PET, when the arrays are oriented edge-on with respect to incoming photons, the depth coordinate Z between the cathode and anode can represent either the axial or the tangential (transaxial) coordinate in the corresponding system design, depending on the orientation of the detector plates with respect to the system axis.

Signal propagation characteristics in the cross-strip detector have been studied. Signals induced on the cathodes 36 typically fall off approximately linearly with interaction depth from the cathode and, for interactions not immediately below a cathode strip, are sensed by two or more cathodes. The anodes 34, on the other hand, because of their narrow width and the presence of the broader steering electrode, do not sense the electron cloud until it is relatively close. Thus, since the weighting potential is localized in the immediate vicinity of each anode, the anode signals are not significantly affected by hole trapping. The effect of this is that the anodes 34 are sensitive mostly to the electron signal, equivalent to the "small pixel effect" often exploited in the design of pixellated CZT detectors. The electron signal, however, is still subject to trapping at roughly the 10% level for shallow interactions (occurring near the cathode plane) due to relatively long drift times to the anode. Given the large dependence of the cathode signal on depth, the anode signal can be corrected for its depth dependence by analyzing and calibrating the cathode/anode signal ratio to substantially mitigate photopeak tailing and achieve energy resolutions of ~2% FWHM at 511 keV.

Since the electron charge cloud produced by a high energy photon interaction may be as large as a few hundred microns at the anodes 34, for strip detectors with 500 µm pitch, a significant fraction of interactions will produce charge clouds that are sensed or shared by two adjacent anodes. Charge sharing effects have been studied extensively. Additional improvement in the photopeak response is possible through the use of neighbor-strip summing to correct for charge sharing. To recover the full signal for such events, the preferred data processing system includes the contributions from neighbor strips in the event energy measurement. That is, the pulse heights from all involved anodes are summed for each event to form the total pulse height from which the energy response is determined. In addition, the transverse position can be accurately determined from the ratio of the individual anode signals involved. This information allows a correction for signal loss to the steering electrodes and gaps.

Figures 14A, 14B, 14C, 14D:
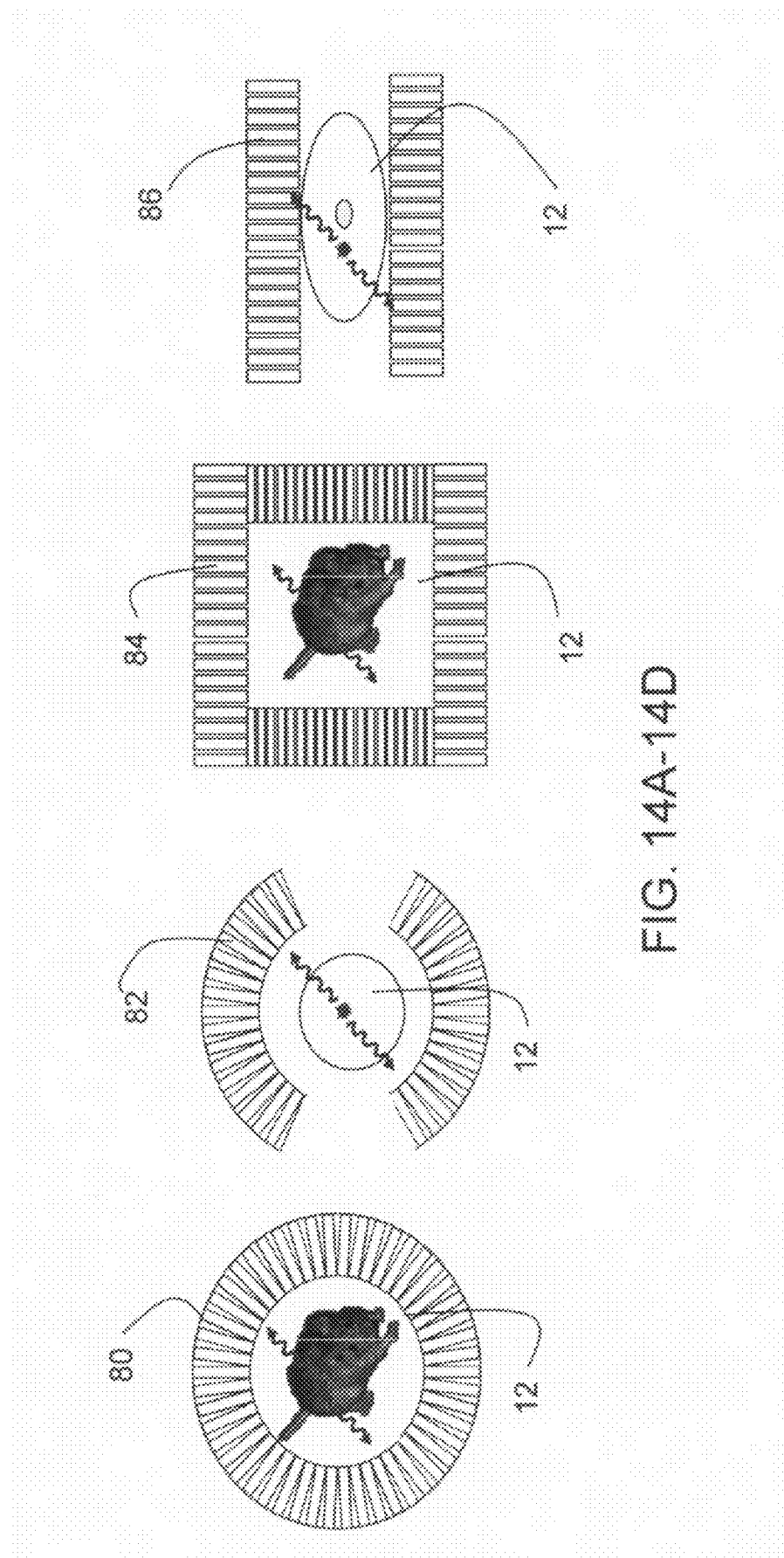
FIGS. 14A-14D show cross-sections of cylindrical tube, multiple arcs, box or diamond, and dual flat-panel designs for arrangement of semiconductor detector arrays, respectively.

Instead of the cross-strip CZT detector plate 30, alternative embodiments include a fully pixellated (matrix of tiny square pixels electrodes) CZT array, examples of which are shown in FIGS. 14A-14C. This array type preferably includes one common plane cathode and a pixellated anode plane. Two devices tested had 5 mm thickness, and 64 (8×8) and 256 (16×16) pixels, respectively. The 64-pixel device had 2.4 mm pixels (platinum) on a 2.5 mm pitch (eV Products, Saxonburg, Pa.). The 256-pixel device had 2.25 mm pixels (indium) on a 2.5 mm pitch (Imarad, Rehovot, Israel). Due to the relatively large anode pixel sizes and fully pixellated nature, these devices will not yield as good energy and spatial resolution results as preferred cross-strip arrays and may require over five times as many readout channels per area. However, for photon detection methods other than PET, it may be desired to use the pixellated arrangement.

The resistivity and leakage current in both pixellated detectors were measured by measuring the I-R drop across the GΩ load resistor on each detector. The measured resistivity and leakage current for the eV Products and Imarad CZT material are, respectively, $1.5 \times 10^{11}$ and $3.0 \times 10^{10}$ Ω-cm, and 0.4 and 2.0 nA at 200V across the detectors. These parameters reassure us that the Imarad material, which is a possible material for a preferred cross-strip detector because it is less costly, is of high quality.

To connect the electrodes of the detectors tested to the readout electronics, "zebra strips" (z-strips) by Fujipolly were utilized in an exemplary embodiment, which allow easy assembly and disassembly for testing. The z-strips are pieces of silicon rubber with silver particle-loaded planes of strips with 125 µm pitch. For the cross-strip array, the strips preferably are placed on the pads at the end of each electrode plane on either side of the detector and pads on the bias board are aligned with the other side of the z-strip. The bias board provides the bias R-C network to each individual anode and the steering electrodes and runs their signals to a set of microconnectors. By applying pressure on the z-strips the electrical contact between the pads and electrodes are made. In the case shown in FIG. 1, ⌈-shaped z-strips were used to channel the signals from the top of the detector to the circuit board directly underneath the array (not shown).

FIG. 6 shows the cross-strip detector plate 30 mounted in a fan-out carrier board, which also holds bias and filter components. The 128 (anode plus cathode) signal channels were routed to individual input channels of eight 32-channel ASIC signal processors called RENA chips (Readout Electronics for Nuclear Applications) developed by Nova R&D, Inc. (Riverside, Calif.). Each RENA channel includes a charge sensitive preamplifier, shaping amplifier, peak detector and peak sample and hold, smart/sparse readout technology, and output to a common pulse height analyzer. The RENA boards and a support boa rd with the ADC for digitizing the individual pulse heights, communicate with a logic board which has a FPGA controller and provides all power and data connections to the lab computer. The RENA chips are controlled and read out by a laboratory PC based analysis system.

Figure 7B:
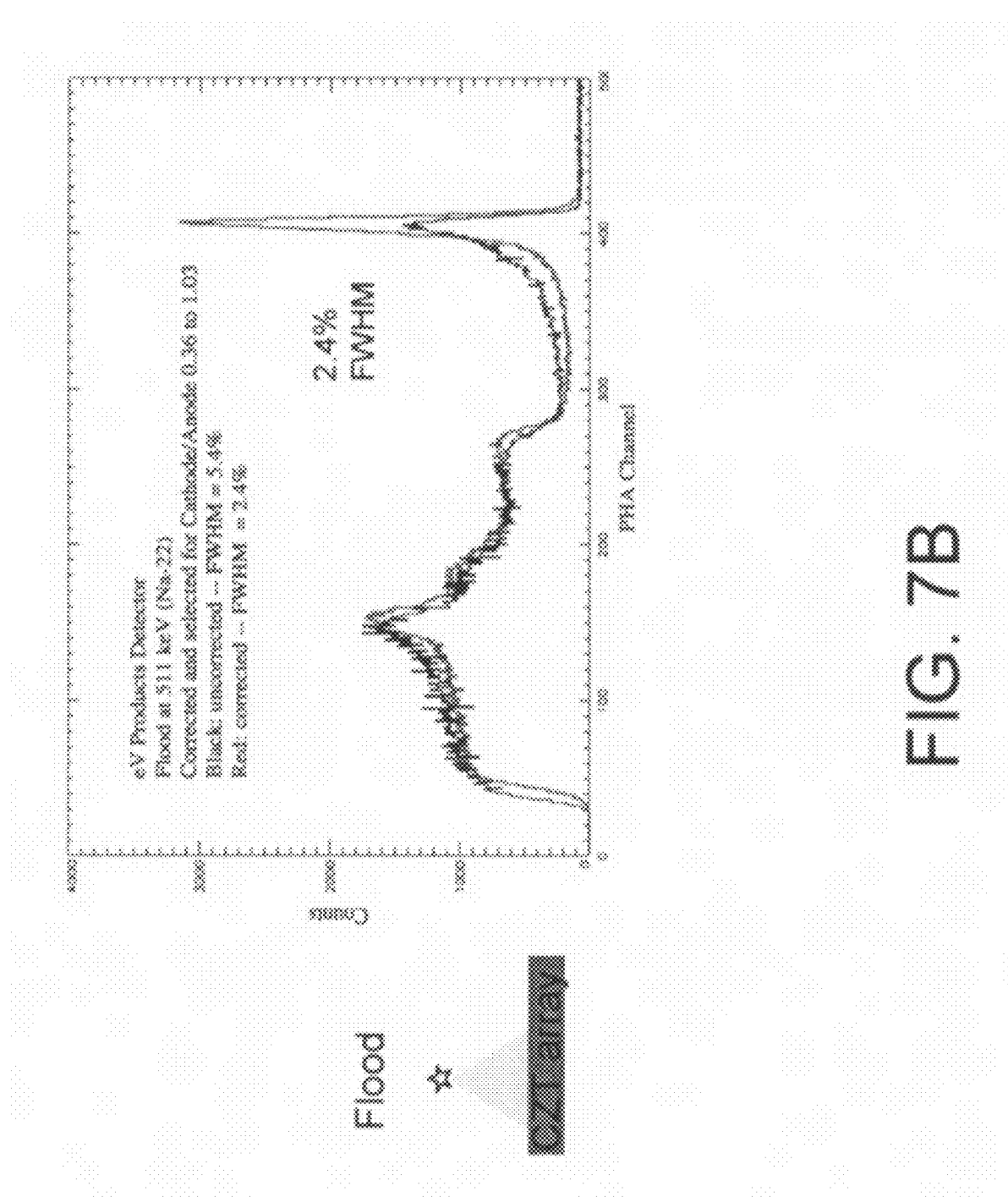
FIG. 7B shows Na 511 keV pulse height spectra measured in a 5 mm thick eV Products CZT detector array irradiated with flood irradiation of photons.

FIGS. 7A-7B show the result of irradiation of the pixellated eV Products 5 mm thick detector (500 V bias) by both a collimated ~0.8 mm width) beam (left) and flood irradiation (right) of $^{22}$Na (511 keV) photons. The amplitude of the signals in CZT detectors is a function of interaction depth, which is also the case for scintillation detectors. In CZT this depth dependence is due to incomplete charge collection for interaction sites far from the anode. This variation in charge collection with depth produces a low energy tail in the peak of the pulse height spectrum as seen in the before-correction spectra of FIGS. 7A-7B.

In CZT, the interaction depth for each event can be accurately determined from the ratio of cathode to anode signals, and with proper calibration of correction factors this charge attenuation affect can be corrected for each event. That is, using the cathode to anode ratio, correction factors are determined and the pulse height for each event is multiplied by the appropriate correction factor. Each event can be thus be corrected for depth dependent charge attenuation effects such as hole trapping, and high quality corrected spectra such as shown in FIGS. 7A-7B may be always achieved with an effective increase in photopeak efficiency as compared to the before correction case. The measured energy resolution at 511 keV is 5 and 2% FWHM, respectively, before and after pulse height correction for both the flood (FIG. 7A) and collimated (FIG. 7B) cases. In the plots is shown the case where those events with cathode/anode ratios that are too high (>1) or too low (<0.35) were rejected, which removes some of the events in the Compton scatter continuum, but does not change the corrected photopeak efficiency.

Figure 8:
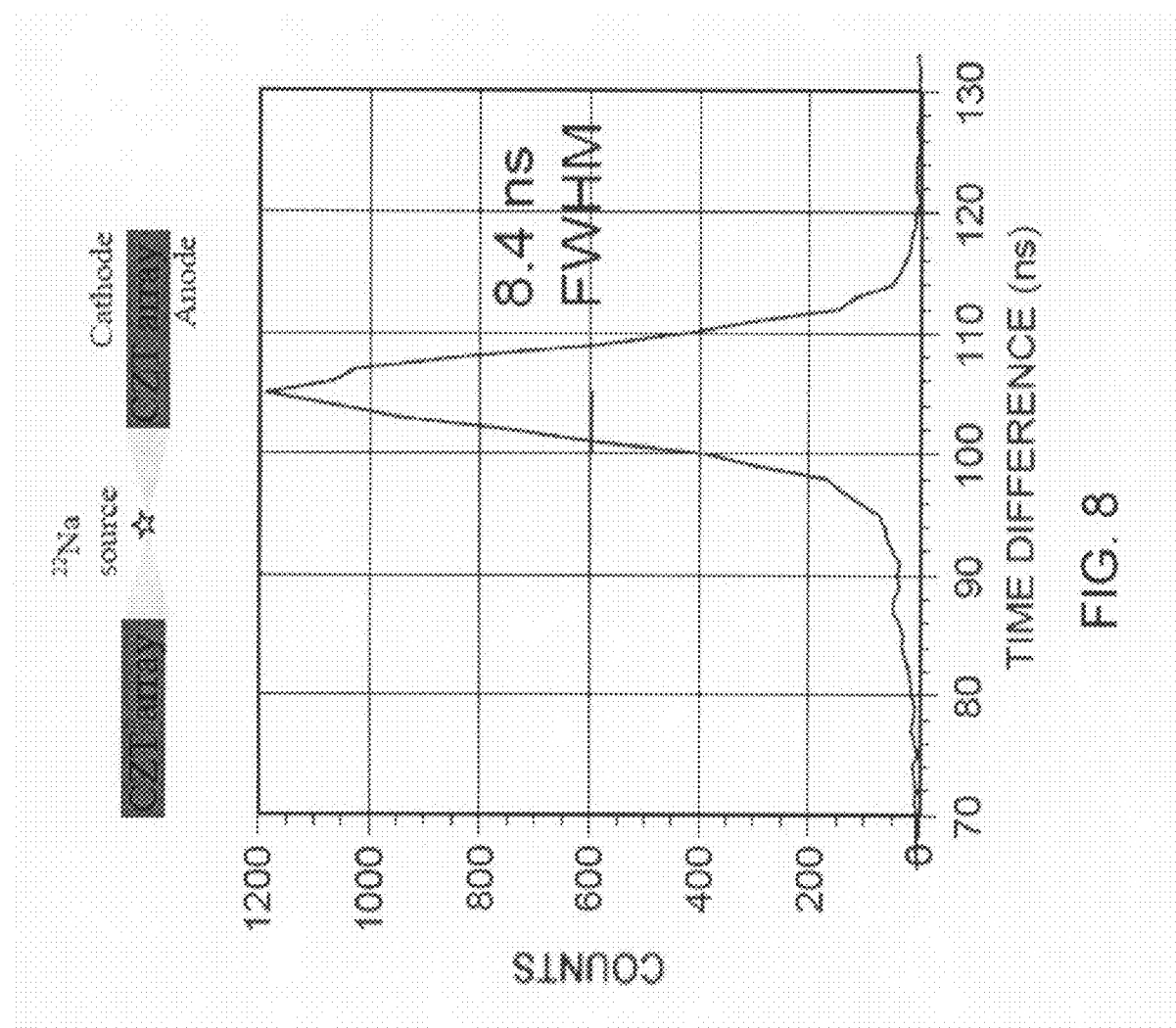
FIG. 8 shows coincidence time (time-amplitude converter (TAC)) measured from rising signals induced on cathodes of opposing CZT detectors arranged edge-on with incoming 511 keV photons.

To assess coincidence time resolution measurements in CZT, we arranged two 2 mm thick CZT detectors with planar cathodes were arranged edge-on with respect to each other $^{22}$Na point source were placed between the two detectors, and the time-to-amplitude converter (TAC) response was recorded as a function of bias voltage and energy threshold (leading edge discrimination was used). The start and stop signals for the TAC unit were provided by the two detector cathode signals. FIG. 8 shows the resulting TAC spectrum using a 400 V bias and a 450 keV energy threshold. A coincidence time resolution of 8.4 ns FWHM was achieved.

The system coincidence time resolution is determined by the fluctuation of the slope of the voltage signal per time (dV/dt) induced on the cathode by a moving charge carrier. This slope fluctuates when there are a range of energies absorbed, significant leakage current, and varying interaction depths. With a narrow window around the photopeak and a relatively low bias voltage, the rise-time fluctuations are dominated by the interaction depth dependent charge collection. Interaction depth information provided by CZT detectors may be used to improve coincidence time resolution by correcting event time stamps, similar to the method used to correct pulse height variations for better energy resolution.

Figure 9A:
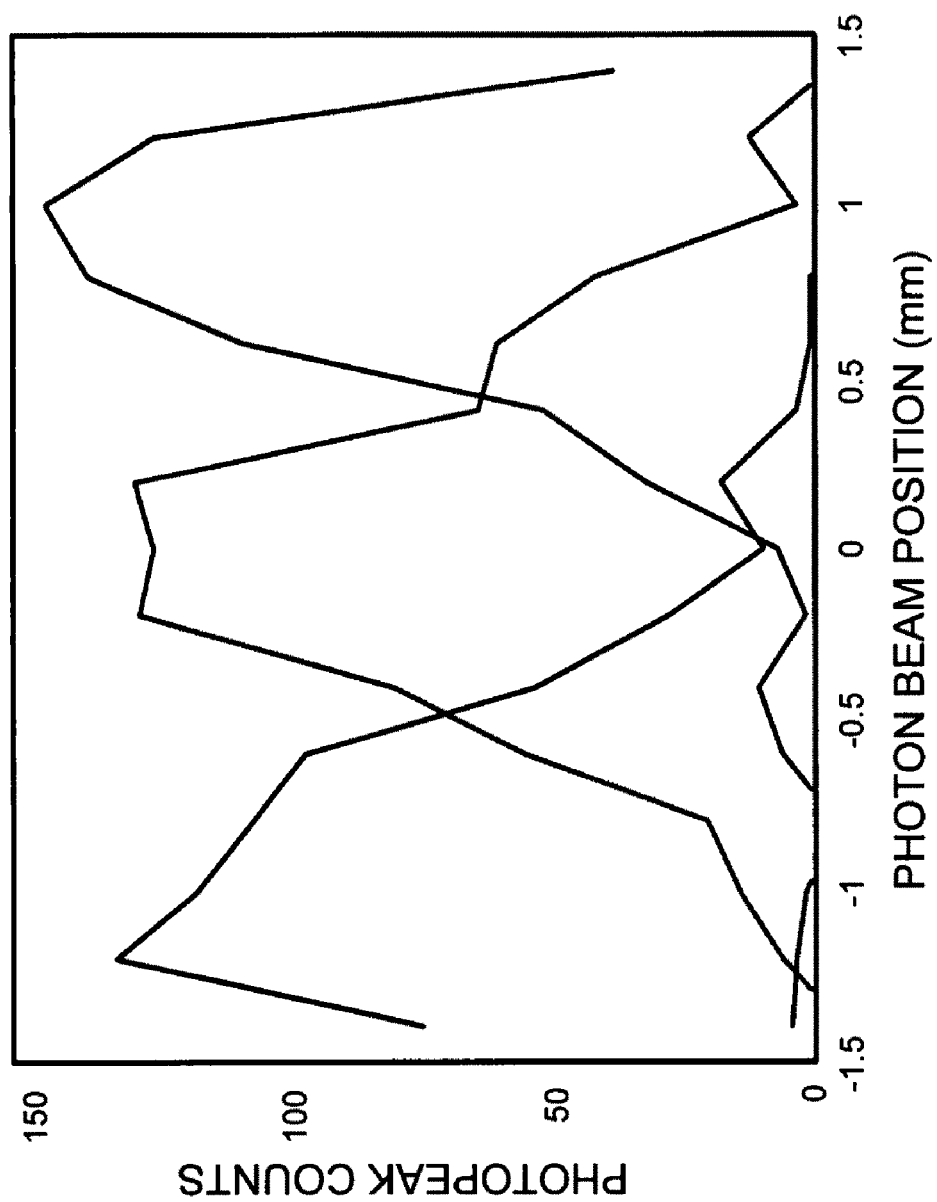
FIG. 9A shows a response of 32×32×2 mm$^3$ detector with anode strips connected into three groups of two for an effective pitch of two to a collimated beam of 511 keV photons translated across ~3 mm region in 0.2 mm steps.

Next, the spatial response of the cross-strip CZT detector was tested. The 32×32×2 mm$^2$ cross-strip array has anode and cathode strip pitches of 0.5 mm. By grouping sets of two adjacent anodes and 10 adjacent cathodes one can simulate a preferred anode and cathode strip configuration, respectively, which have 1.0 mm and 5 mm pitch. FIG. 9A shows the resulting anode response for three such groupings of adjacent anodes. A collimated beam (~0.8 mm width) of 511 keV photons was stepped across the three effective strips in 0.2 mm steps. The plot shows the effective 1 mm anode pitch response and how the charge is shared between adjacent anodes as the beam translates over the region between them.

Figure 9C:
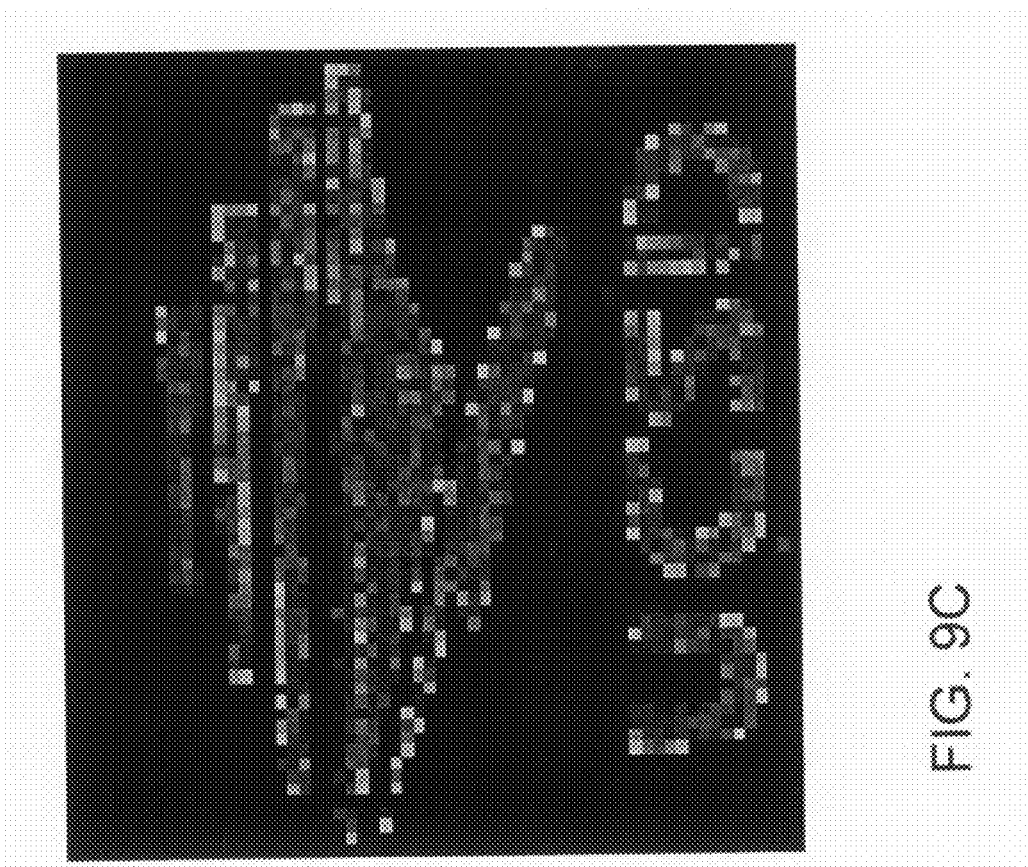
FIGS. 9B-9C show a tin mask excised to demonstrate spatial response of an exemplary CZT cross-strip detector and a shadow image of 60 keV rays transmitted through the tin mask, respectively.
Figure 9B:
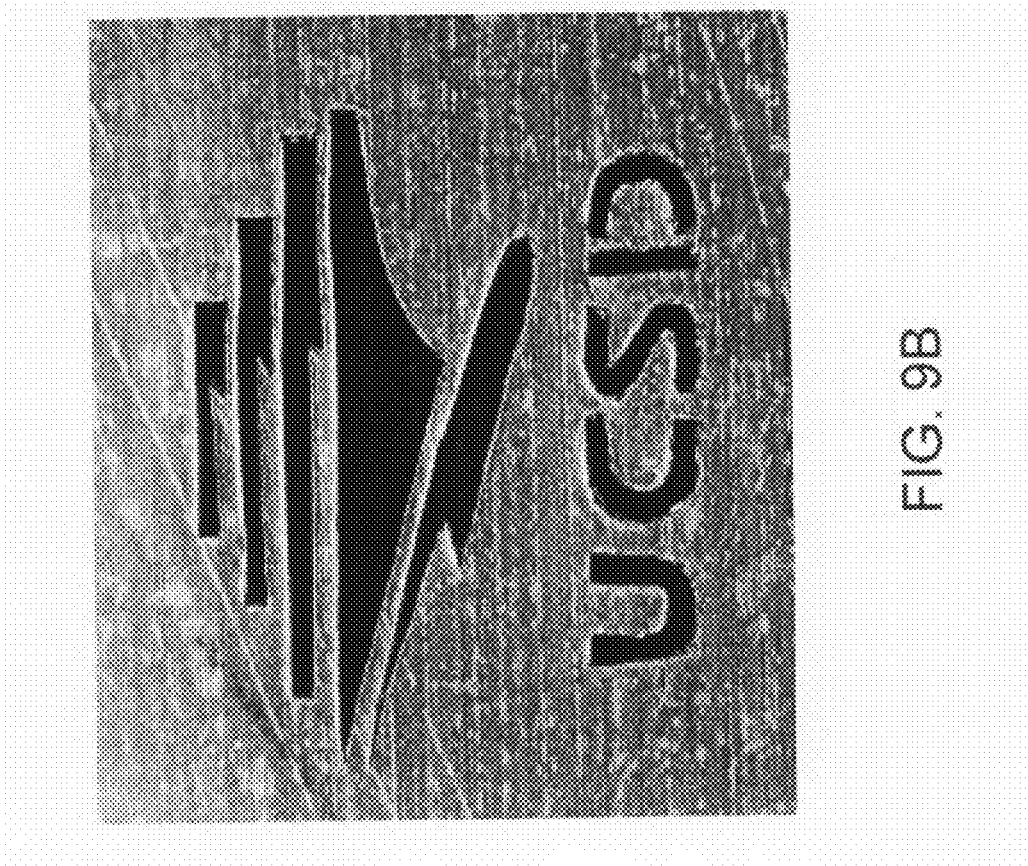

FIG. 9C shows imaging results from projecting 60 keV x-rays through a tin mask with a logo excised (FIG. 9B) onto the 32×32×2 mm$^3$ cross-strip CZT detector. The anodes and cathodes in this case were not grouped and the full 64 strips were read out by the RENA system. Some of the individual pixels are seen in the open areas of the resulting transmission image, and the detector clearly resolves 0.5 mm features, such as the thin diagonal tin strip extending down from the upper left to lower right of the library pattern in the logo. These results indicate that the intrinsic spatial resolution of the cross-strip device is at least as good as the strip pitch.

Figure 10:
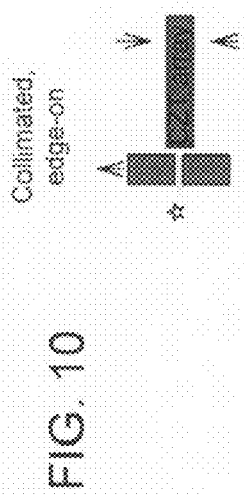
FIG. 10 shows an exemplary CZT array arranged edge-on with respect to a collimated photon beam.

Next, the spatial response of pixellated Imarad and eV products detectors was assessed when oriented edge-on with respect to incoming 511 keV photons. In one preferred system configuration, shown in FIG. 10, pixellated CZT detector arrays 50 are arranged in a ring edge-on with respect to incoming photons 14. This means the tangential coordinate of an interaction in the scanner would be determined by where, in between the cathode, an anode energy was deposited. Thus, a key ingredient is to demonstrate accurate capabilities to determine the interaction depth between cathode and anode.

The edge of the eV Products and Imarad pixellated arrays were irradiated with a 0.8 mm wide beam of 511 keV photons and the beam position was stepped in several spots between the cathode and anode. To analyze the signal formation properties as a function of depth a TAC analysis was used, this time with the start signal provided by the cathode and the stop by the delayed anode signal of the same detector. The TAC signal is an indication of interaction depth between the anode and cathode and so is directly related to the ratio of cathode to anode signals. A small TAC signal represents a deep interaction, relatively far from the cathode, with shorter charge drift times to the anode and more complete charge collection by the anode. A large TAC value corresponds to relatively shallow events, close to the cathode, with longer electron drift times to the anode.

Figure 11A:
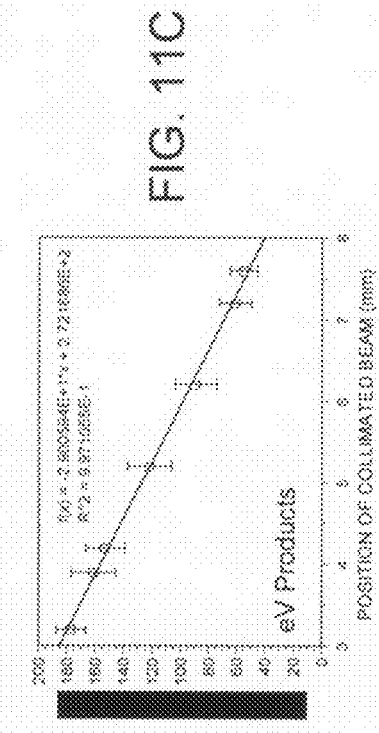
FIGS. 11A-11D show cathode to anode TAC spectra vs. collimated (0.8 mm wide) beam position for edge-on irradiation of 5 mm thick eV and Imarad pixellated detectors (FIGS. 11A-11B), and a relationship between peak TAC value and cathode to anode depth coordinates (FIGS. 11C-11D)
Figure 11B:
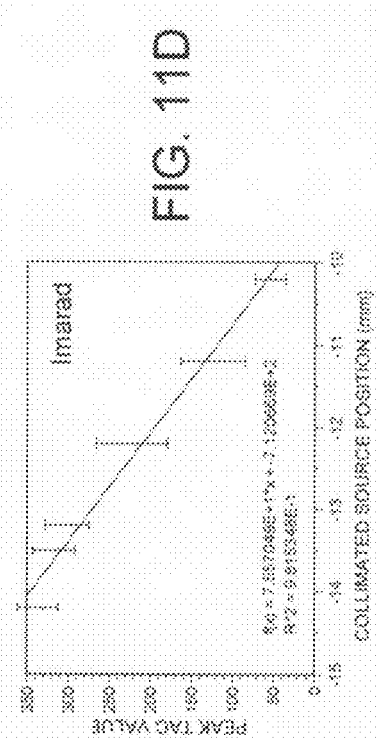
Figure 11C:
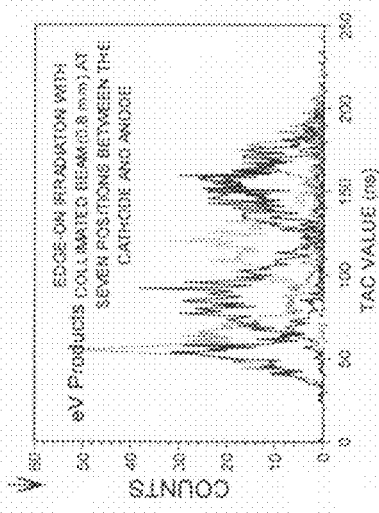
Figure 11D:
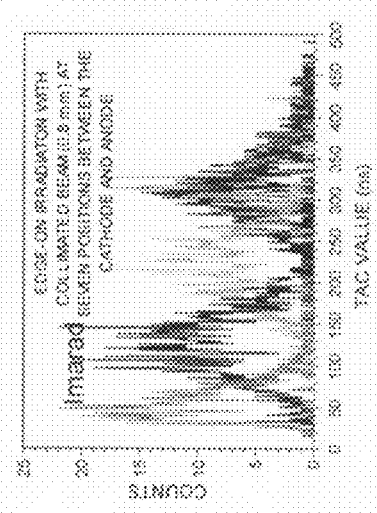

FIGS. 11A-11D show the important results that in both detector materials the TAC spectrum moves as the photon beam moves and there is a linear relationship between interaction depth between the cathode and anode and the TAC signal. The TAC signal is thus a direct measure of the point spread function of the depth coordinate. Thus, if one can time the time difference between when the anode and cathode signals rise, one can know the interaction depth to high accuracy. As seen in FIGS. 11C-11D, the resolution of the depth coordinate is <1 mm. This relationship is expected to be even more pronounced with a cross-strip electrode design. The same linear relationship is expected between cathode/anode ratio and interaction depth between cathode and anode.

Next, characterization of 511 keV Interactions in exemplary CZT arrays (cross-strip arrays) was determined. Monte Carlo simulations of 511 keV photon interactions were performed in both CZT and common scintillation crystals used in high resolution PET systems. In the simulations for all materials a sharp beam of 511 keV photons was directed onto the center of an 8 cm wide by 4 cm high area of detector material. This simulated area corresponds to sixteen of the preferred 40×40×5 mm$^3$ thick detectors stacked together and arranged edge-on with respect to the incoming photon beam. For the CZT simulations 4 cm thickness was assumed in the direction parallel to the beam, as preferred (see FIG. 12).

Figures 12A, 12B:
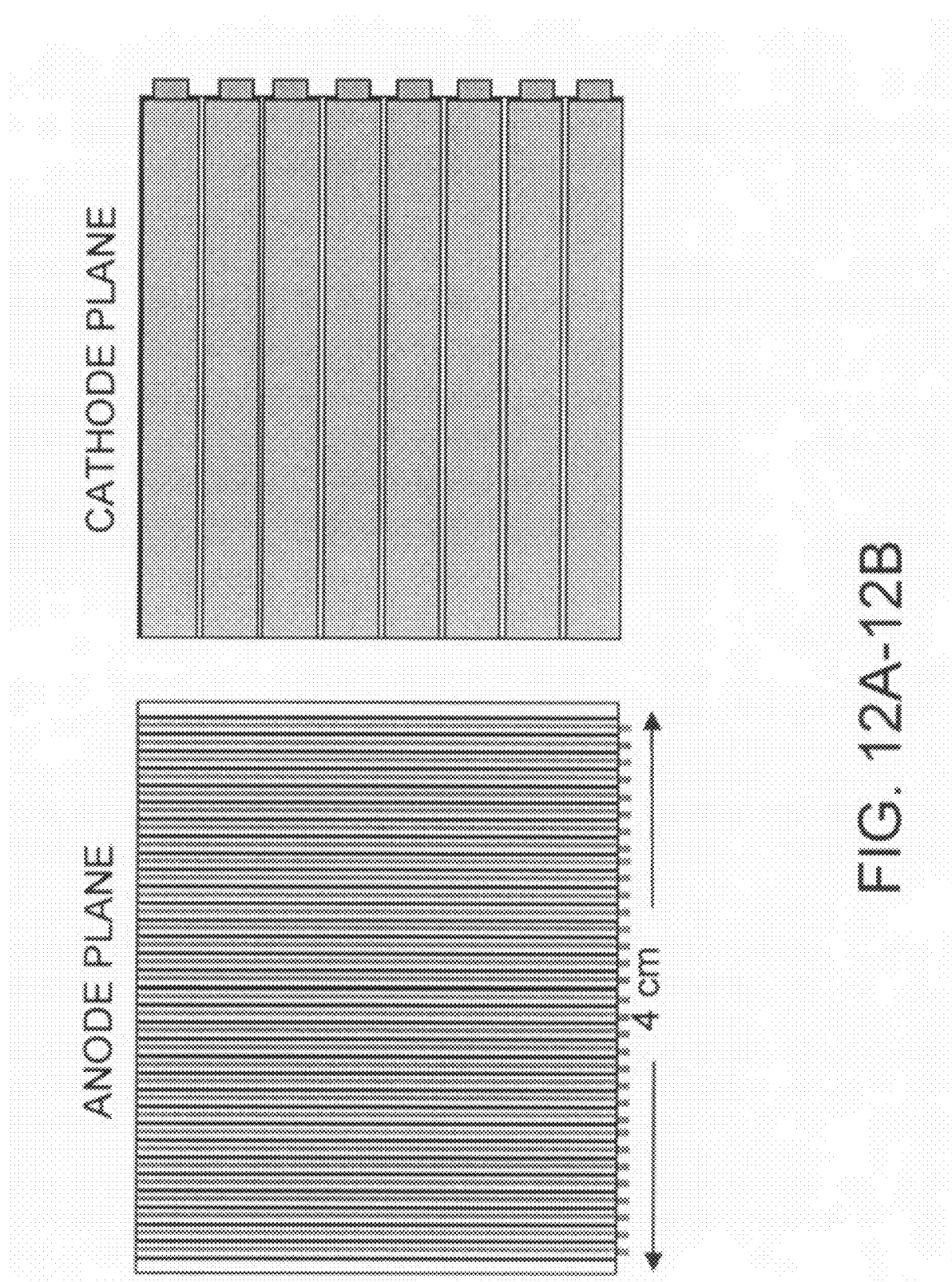
FIGS. 12A-12B show a preferred embodiment anode plane and cathode plane for a cross-strip CZT detector plate, respectively.

FIGS. 12A-12B show a schematic depiction of anode and cathode planes of one preferred CZT cross-strip detector design. In FIG. 12A, the anode plane comprises 40 anode strips (grey) on a 1 mm pitch, each 50 μm wide. 200 μm wide steering electrodes (black) reside between each anode. Two guard strips reside on the outer perimeter. As shown in FIG. 12B, the cathode plane on the other side of the CZT wafer uses 8 strips, each 4.95 mm wide on a 5 mm pitch orthogonal to the anode strips.

Figure 13:
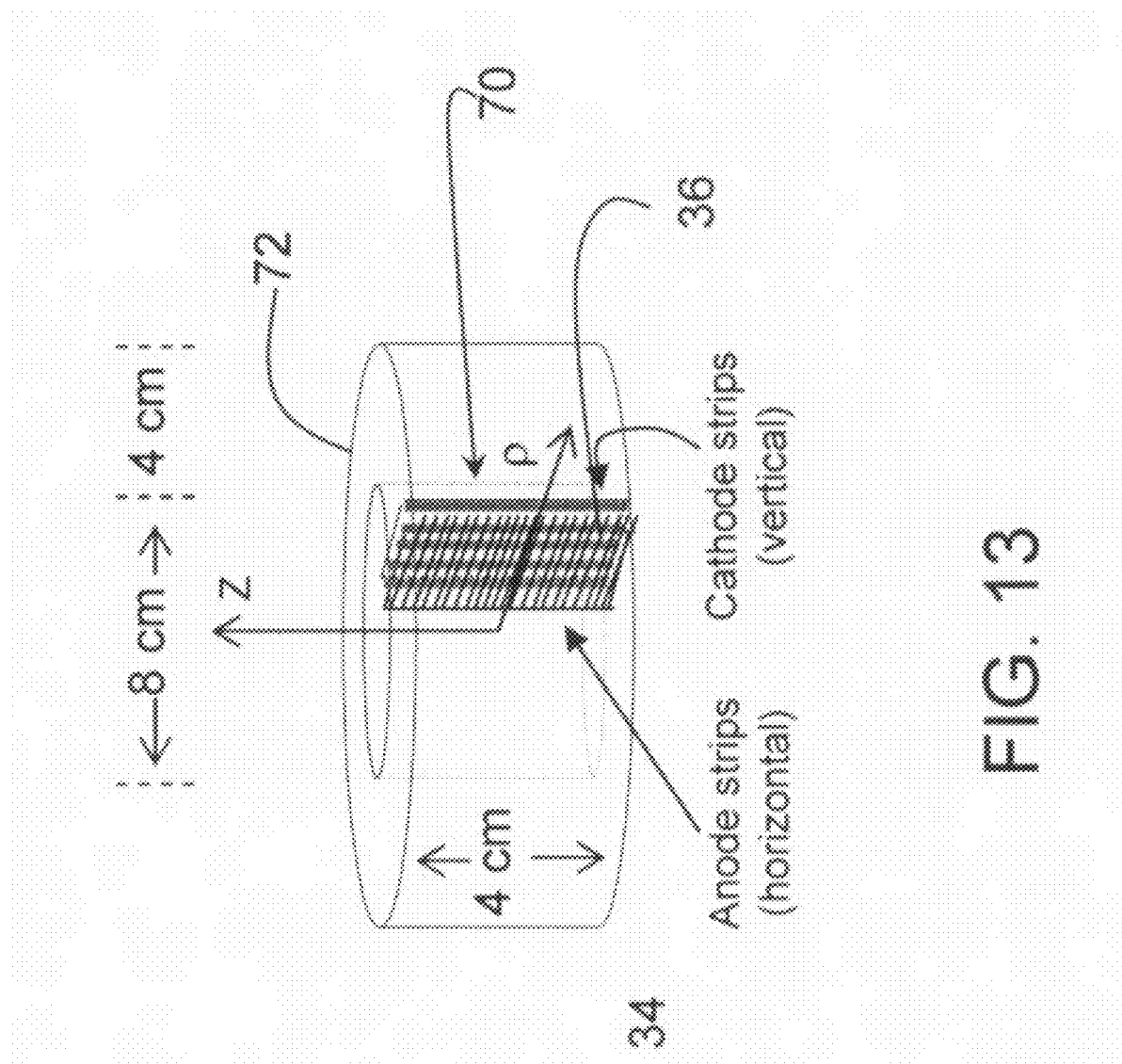
FIG. 13 shows an exemplary arrangement for a cross-strip detector of a cylindrical detector gantry.

FIG. 13 shows one cross-strip detector 70 of a cylindrical detector gantry 72. In the detector orientation preferred, the anode signals determine the axial coordinate of the interaction and the cathodes determine the radial (ρ) direction. The tangential direction (φ) is determined by the depth of interaction between the anode and cathode planes. The connections to the RENA board will be made at the outer radius for the anode pads and at the top end of the tomograph cylinder for the cathode pads.

natively, such efficiency requires less imaging time to obtain a given image quality level.

For scintillation crystal simulations assumed 1.0, 1.5, and 2.0 cm thickness were assumed. 1.0 cm thickness detectors are used in existing Concorde Microsystems (LSO) and Philips Medical Systems (GSO) high resolution small animal PET systems. The results for the types of interactions a 511 keV encounters are given in Table 1, below (106 events simulated). The 1.5 and 2.0 cm thick scintillation crystal data is present for comparison.

| Detector Material | Thickness (cm) | Fully Absorbed | Photoelectric (PE) Only | 1 Compton +PE | 2 Compton +PE | 3 Compton +PE | >3 Compton +PE | Only Compton | No Interaction |
|---|---|---|---|---|---|---|---|---|---|
| LSO | 1.0 | 41.2 | 19.4 | 15.5 | 5.2 | 1.0 | 0.2 | 13.2 | 45.6 |
| LSO | 1.5 | 56.7 | 24.7 | 21.7 | 8.1 | 1.8 | 0.3 | 12.5 | 30.8 |
| LSO | 2.0 | 68.2 | 28.3 | 26.3 | 10.6 | 2.5 | 0.5 | 11.1 | 20.8 |
| GSO | 1.0 | 31.4 | 12.9 | 12.2 | 4.9 | 1.2 | 0.2 | 15.8 | 52.8 |
| GSO | 1.5 | 45.2 | 16.9 | 17.7 | 8.0 | 2.1 | 0.4 | 16.4 | 38.4 |
| GSO | 2.0 | 56.4 | 19.8 | 22.1 | 10.7 | 3.1 | 0.7 | 15.6 | 28.0 |
| BGO | 1.0 | 48.1 | 26.4 | 16.6 | 4.3 | 0.7 | 0.1 | 10.3 | 41.7 |
| BGO | 1.5 | 63.8 | 33.1 | 22.8 | 6.6 | 1.2 | 0.2 | 9.2 | 27.0 |
| BGO | 2.0 | 74.9 | 37.5 | 27.1 | 8.4 | 1.6 | 0.2 | 7.8 | 17.3 |
| CZT | 4.0 | 67.7 | 15.4 | 24.5 | 17.5 | 7.6 | 2.8 | 19.1 | 13.2 |

FIGS. 14A-14D shown exemplary configurations of CZT detectors stacked edge-on with respect to incoming photons to form a PET system. FIG. 14A shows a cylindrical tube 80; FIG. 14B shows two detector arcs 82 from a cylindrical tube; FIG. 14C shows a box or diamond configuration 84, which from calculations has the highest geometric detection efficiency for the preferred rectangular plate CZT detectors; and FIG. 14D shows a dual flat-panel design 86. Note that in principle any appropriate human organs or animals can be imaged in the shown configurations, including a human breast, head or full body provided the aperture size is appropriate.

The box configuration 84 shown in FIG. 14C provides certain benefits for photon detection. Tests performed have shown that the box configuration 84 provides substantially improved coincident detection efficiency (e.g., a factor of seven), also referred to as instrument sensitivity, and spatial resolution, 3-D interaction localization, and lower random and scatter background contamination for enhanced image quality and quantitative accuracy compared to conventional high-resolution animal PET systems. This is due to, for example: the small possible system detector aperture, so that detectors are closer to photon emissions from the subject; the detectors can be made thicker; the detectors can be packed more closely together; and the detectors can have higher photon energy resolution (e.g., 3% vs. >18%). Higher energy resolution improves instrument sensitivity because it allows one to use a narrower electronic pulse height window setting for rejecting more random and scatter background events, while maintaining a large fraction of good events.

The improved coincident detection efficiency may allow, in turn, improved detection, visualization, and quantification of subtle molecular signals emanating from molecular processes that are interrogated using a PET molecular probe. Counting more annihilation photons in a given time means less smoothing required during the tomographic image reconstruction process, which helps to achieve the desired spatial resolution for better visualization of molecular signals. Alter- In the simulated detector, the events are considered fully absorbed if a photoelectric absorption results somewhere within the region irradiated and the total energy deposited is above a given threshold. For the preferred CZT detector arrays tested, the energy resolution at 511 keV is ~5% and 2% FWHM, respectively before and after depth dependent pulse height corrections. This high energy resolution allows one to use a much narrower energy window, while still maintaining a high sensitivity. Note that even without depth dependent corrections 5% FWHM energy resolution at 511 keV is outstanding compared to the best number of 12-14% from relatively large LSO crystals that do not have interaction depth resolution. If the system lower energy threshold can be set even lower (e.g., at 470 keV), this would significantly reduce random and scatter coincidences as well as limit system dead time.

Due to the difficulties in simulating accurate energy resolutions for all scintillation crystal dimensions for a fair comparison with CZT, perfect energy resolution for all materials was assumed; With energy resolution effects incorporated, the significantly higher energy resolution of CZT would modify the values in Table 1 in a direction even more in favor of CZT. Thus, for the simulations it is assumed if the sum of all interaction energies per event is not exactly 511 keV it was placed under the "Only Compton" category. A small fraction of the "Only Compton" events would be moved into and increase the "Fully Absorbed" values provided the event energy sum was above a defined threshold. Note also that a fraction of "1 Compton+PE" events that occur within a highly localized volume cannot be distinguished from a single photoabsorption, which would effectively increase the "Photoelectric Only" column value. For example, in the preferred CZT detectors such highly confined events would add 6.6% to the current effective "Photoelectric Only" value of 15.4% for a total of 22.0% effective "Photoelectric Only". If the photon traversed the material without any interactions it was put in the "No Interaction" column. Note the sum of "Fully Absorbed"+"Only Compton"+"No Interaction" values is always 100%. From the simulations one can make the following conclusions:

Total absorption probabilities are higher in the preferred CZT detector. From Table 1 it is seen that although CZT in principle has a smaller linear attenuation coefficient at 511 keV, in the preferred edge-on orientation of the CZT detectors the photons will see a much greater thickness of material (4 cm). Thus, compared to <2.0 cm thick LSO, the fraction of fully absorbed events is much higher (~68 vs. 41% for singles and 46 vs. 17% for coincidence) for the preferred CZT detectors. For all the crystal entries listed in Table 1, only the 2 cm thick BGO would have higher absorption probability than the preferred CZT detector. Note that the 4 cm thick CZT has a significantly higher photoelectric-fraction compared to 1.0 cm thick GSO.

Multiple Interactions are not a problem for the preferred CZT detectors. In scintillation or CZT detector systems, due to scatter the events may be absorbed in multiple detector modules. From Table 1 it is seen that that the number of fully absorbed two-interaction events (1 Compton+PE) occur more commonly for 2 cm thick LSO and BGO than it does for GSO or 4 cm thick CZT. The fact that there is a higher probability of >2 interactions in 4 cm thick CZT compared to LSO and GSO is not a problem. In the preferred CZT detector configuration the following are true:

(a) The interaction sites may be distinguished in most cases due to the detector segmentation. For example, of the 24.5 value for "1 Compton+PE" events in CZT, 17.7 will have both interactions within the same 5 mm thick detector slab preferred, and of those 16.5 (93%) are resolved by the cathode and anode segmentation. The 1.2 (7%) "non-resolved" two-interaction events would have two spatial separated interaction sites that occur within the same pixel defined by 1 mm anode and 5 mm cathode strips.

(b) The location of the first interaction can be accurately determined using the kinematics of Compton scatter. For example, of the 16.5 "resolved" 1 Compton+PE events, 4.0 will have one energy deposition of 20-165 keV, and due to kinematics, the lower energy deposition will be the first (Compton) interaction site. The other 16.5−4.0=12.5 "resolved" two-interaction events have the lower energy deposition between 165 and 255 keV. In that case, selecting the first interaction location to be where the lower energy deposition interaction occurs will on average result in <1 mm event positioning error (the "correct" position would be along the line formed by the incoming simulated beam).

(c) The sum of the energy deposited in adjacent detectors may be determined. For example, of the 24.5 "1 Compton+ PE" value, 24.5−17.7=6.9 [see (a)] will have interactions in two adjacent 5 mm slabs. The total energy for the event would be the sum of the energies recorded in the two detectors above a selected threshold. Again, using Compton kinematics, selecting the first interaction to be the one with least energy deposition on average results in <1 mm event positioning error for multiple interaction in two detectors.

In summary, compared to <2.0 cm thick LSO, the fraction of fully absorbed events is much higher for the preferred, edge-on, cross-strip CZT detectors. Most of the multiple interaction events involving one or more of the preferred detectors are good events. Since the preferred detector arrays are oriented edge-on with respect to incoming photons, one can identify which detector array slabs are hit, and for Compton scatter events, one can accurately identify which detector was hit first and where. In existing scintillation crystal detectors used in PET such information is typically lost since an event with two crystal interactions will be positioned (inaccurately) somewhere in between the two crystals and none of the analysis described in (3) would be possible. Thus, for the CZT detectors preferred due to the orientation and 3-D positioning capabilities it will be possible to resolve scatter event ambiguities for more accurate event positioning.

Looking at photon count efficiency (sensitivity) estimates for a preferred device, one can estimate the 511 keV point source sensitivity at the center of an example 8 cm diameter, 4 and 8 cm long, 4 cm thick cylindrical shell made of CZT. Exemplary CZT cross-strip detector designs and arrangements are depicted in FIGS. 13A-13B and 14A-14D. From detector simulation results (Table 1), it is expected that ~70% of events directed at a detector will be fully absorbed with energy greater than 470 keV, an example preferred energy threshold. Thus, the coincidence detection efficiency at 511 keV is ~0.7×0.7=0.49. One can assemble (e.g., stack) the detectors edge-on to form a ring with ~40 µm spacing or <1% dead area between two adjacent 5 mm thick detectors for >99% packing fraction. The 5 mm detector thickness in this case corresponds to the tangential (transaxial) dimensions of each detector. The geometric efficiency of the preferred cylindrical shell (8 cm diameter) is roughly 50% and 67%, respectively, for 4 and 8 cm long cylinders. Thus, total coincident count sensitivity would be approximately 0.49×0.99×(0.5 or 0.67)=24% or 33%, respectively, for the 4 or 8 cm diameter long system. The 8 cm long system provides 38% more sensitivity compared to the 4 cm long system. These sensitivity values are an order of magnitude higher than in existing systems, which are <2-3%. This increased count sensitivity will allow one to realize the preferred spatial resolution improvements (1 mm FWHM, uniform) in terms of SNR in the reconstructed images.

To assess a system count rate and dead time, assuming a 100 µCi point source in air, that translates to 3.7 M dis/sec or a detected photon singles rate of (see above): 2(photons)× 0.7×0.99×0.5×3.7 M/sec=2.6 Mcps for the 4 cm long cylinder. The 4 cm long detector ring preferred comprises 50 CZT detector arrays. Thus, the singles count rate per array is approximately 50 kHz for a 100 µCi point source in air. The preferred CZT arrays and data acquisition system will be able to handle this singles event rate. If one assumes the system dead time is determined by the degree of pulse-pileup, and a maximum detector shaping time of 2 µs in the RENA-2 system, each array will independently have a singles rate count capability of 500 kHz before pulse pileup occurs. Thus, for most source configurations dead time is expected to be very low. In fact, one could use up to a 1 mCi point source in air before pulse pileup and dead time occurs. The RENA-2 data acquisition system can handle event rates up to ~1 MHz per 36-channel chip. An example design goal of <2% dead time is set for a 100 µCi point source in air.

In additional experiments performed for additional embodiments, the detector array electrode planes were oriented both face-on (perpendicular to) and edge-on (parallel to) with respect to the incoming photon direction. For each event the anode and cathode signals involved in the interactions were read out and digitized in list mode. Both 22Na (511 keV) and 137Cs (662 keV) photon sources were used for these additional experiments.

Figure 15:
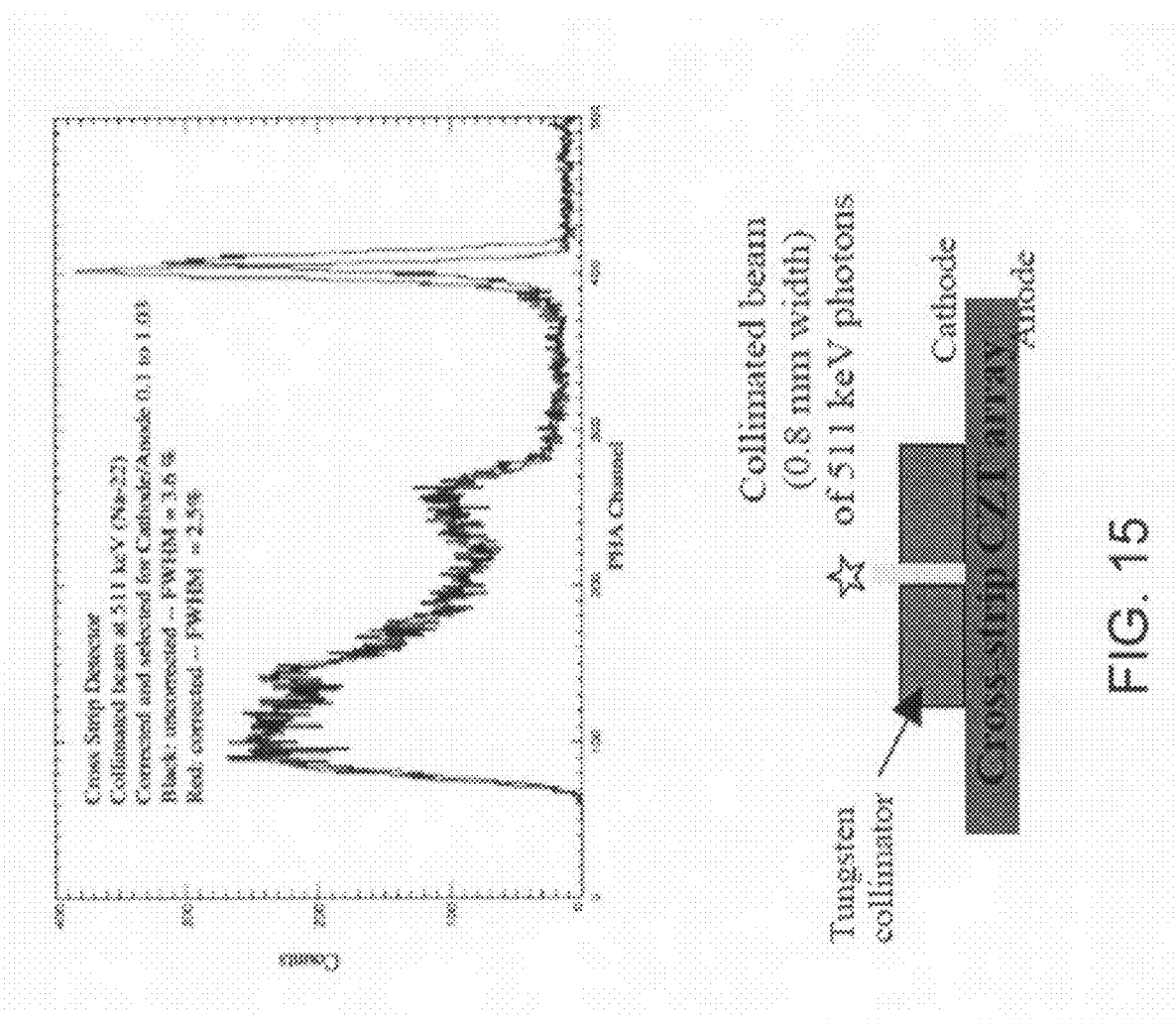
FIG. 15 shows face-on energy $^{22}$Na energy spectra before and after pulse height corrections measured from a single effective anode from an exemplary cross-strip CZT array, tested with adjacent strip grouping to mimic a cross-strip electrode pattern.

The cross-strip CZT array irradiated face-on was analyzed, as shown in the arrangement of FIG. 15. In order to mimic the proposed cross-strip electrode design for cross-strip array experiments, adjacent anode and cathode strips of the original cross-strip array were grouped to produce effective 1 mm anode and 5 mm cathode strip pitches. Unlike the square pixel arrays studied, due to the "small pixel effect" and the "anode weighting potential effect" of the cross-strip array design, the anode pulse heights from the cross-strip detector are much less dependent upon the interaction location (depth) between the cathode and anode. Thus, pulse height corrections do not affect the spectra as drastically as for the large pixel arrays. With correction the cross-strip prototype achieves 2.5% full-width-half-maximum (FWHM) at 511 keV as observed in FIG. 15. The corrected data shown also has a selected cathode/anode signal ratio.

Figures 16A, 16B:
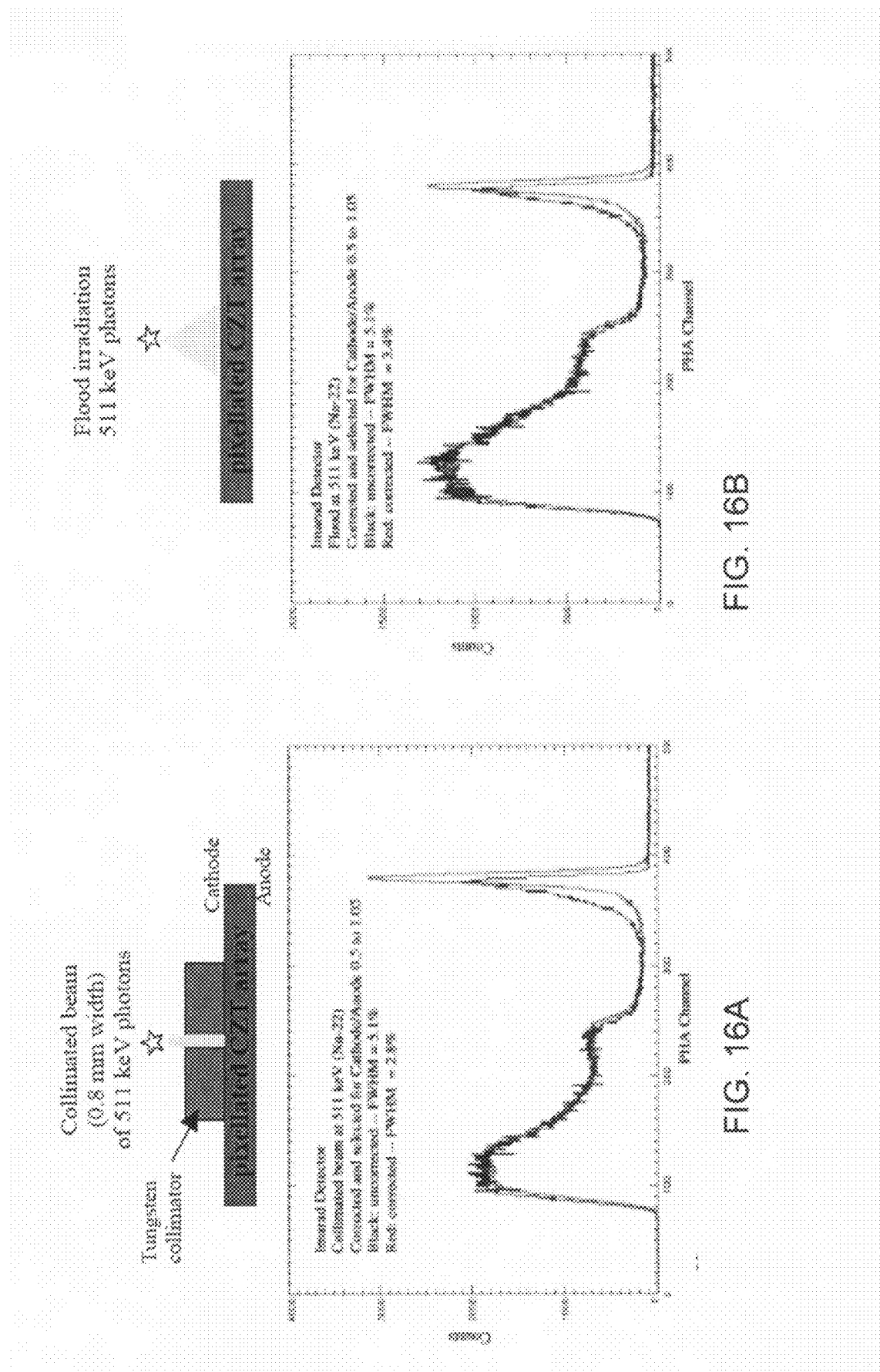
FIGS. 16A-16B show $^{22}$Na keV anode pulse height spectra measured in a 5 mm pixellated anode CZT detector array from Imarad Imaging Systems for collimated and flood irradiation, respectively.
Figures 17A, 17B, 17C, 17D, 17E, 17F, 17G, 17H, 17I, 17J:
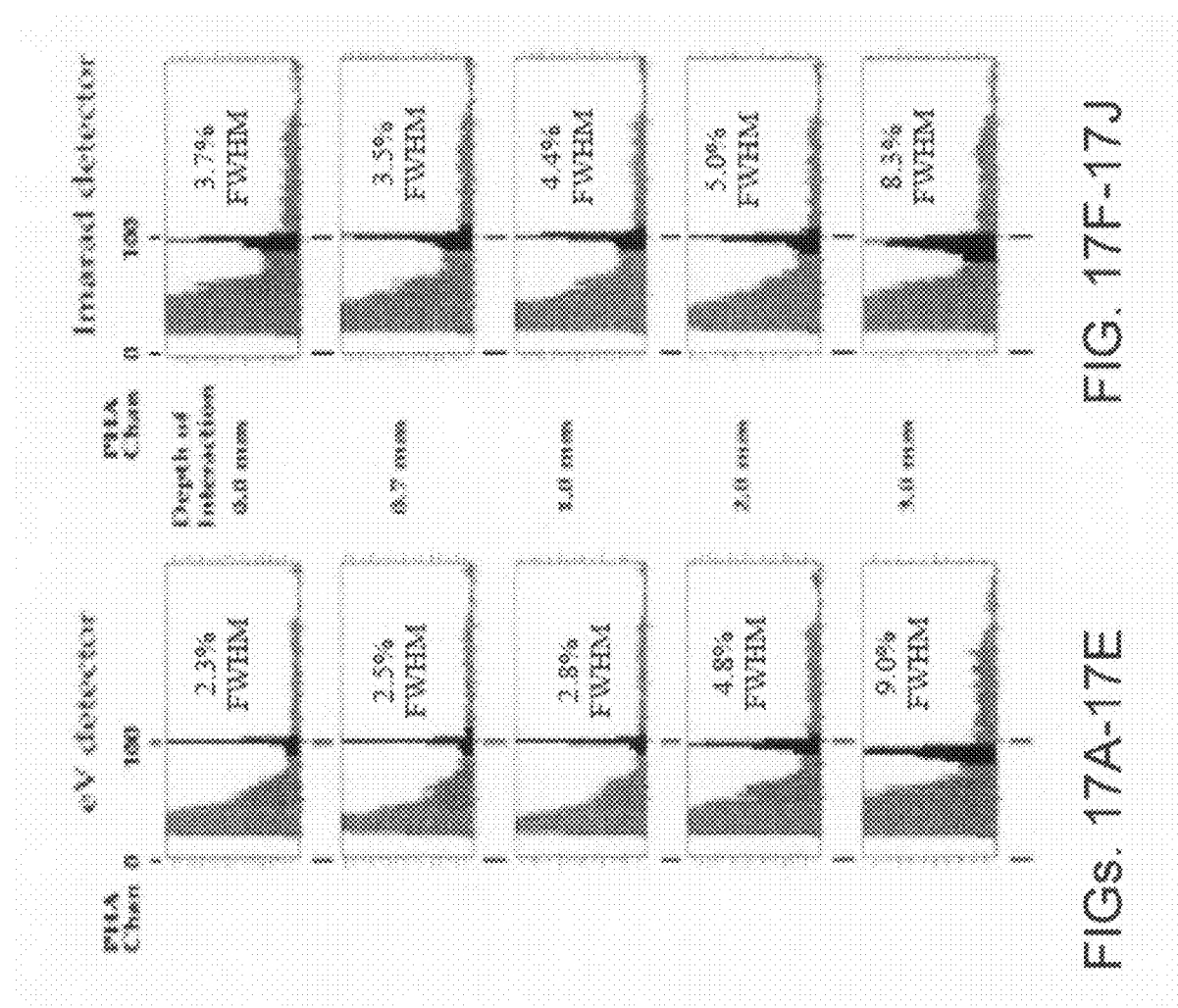
FIGS. 17A-17J show raw, edge-on collimated beam $^{22}$Na energy spectra measured from eV Products (FIGS. 17A-17E) and Imarad (FIGS. 17F-17J) pixellated CZT arrays for various beam positions between the cathode and anode (0.8 mm beam width)

FIGS. 16A-16B show the measured pulse height spectra for face-on collimated and flood irradiation, respectively, for the Imarad pixellated array. These plots demonstrate that the Imarad CZT material also produces high quality energy spectra. In FIGS. 16A-16B, $^{22}$Na 511 keV anode pulse height spectra was measured in the 5 mm thick pixellated anode CZT detector array from Imarad Imaging Systems for collimated (FIG. 16A) and flood (FIG. 16B) irradiation. Spectra shown are before and after pulse height correction for depth dependent charge attenuation using the cathode/anode ratio for each event. The corrected spectra data shown also rejected events with cathode/anode pulse height ratios that were >1 or <0.5, but this ratio thresholding is not necessary in order to improve the photopeak resolution using the pulse height correction method.

Figure 18:
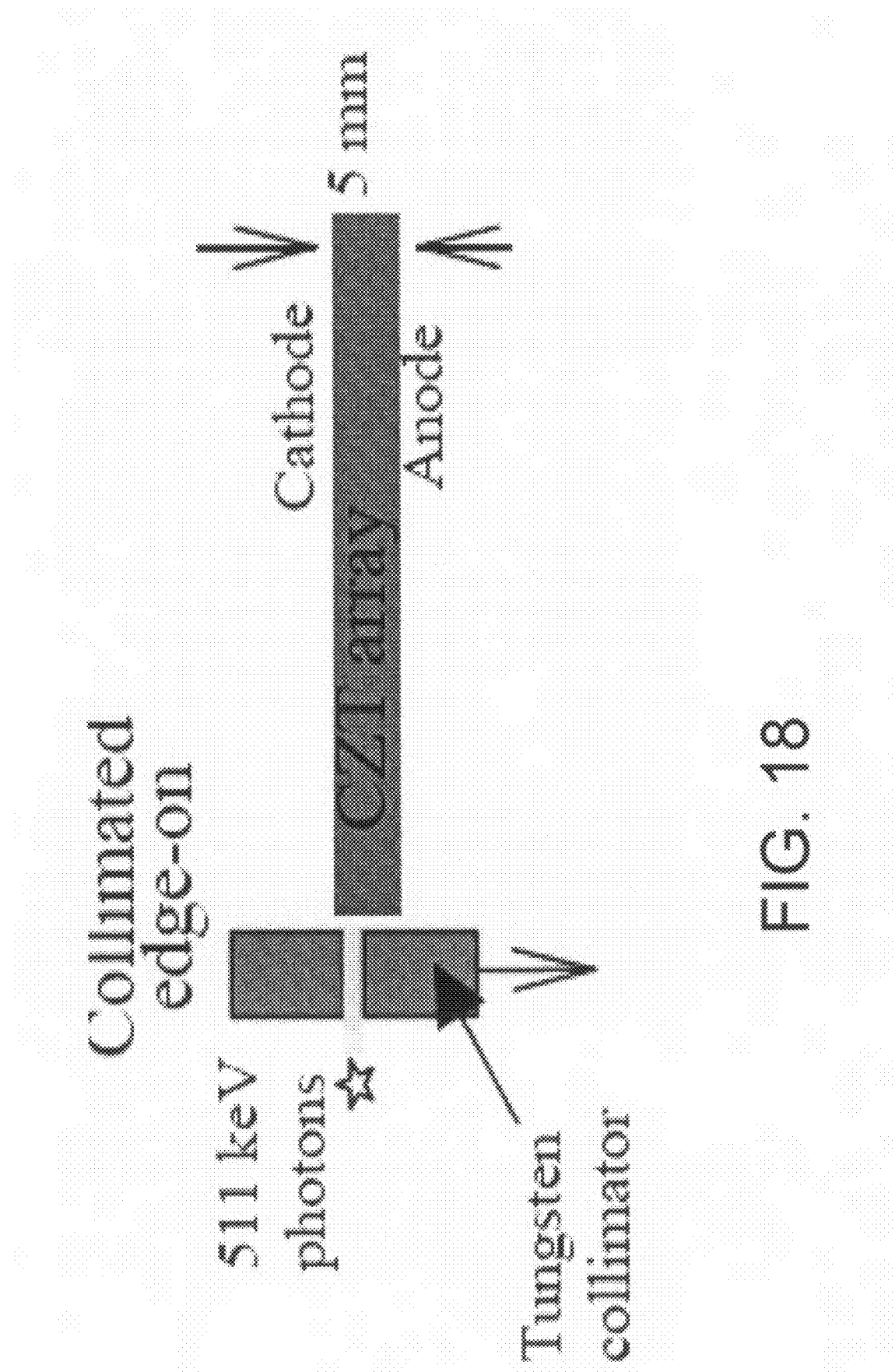
FIG. 18 shows a collimated beam and CZT array structure for the results shown in FIGS. 17A-17J.
Figures 19A, 19B, 19C, 19D:
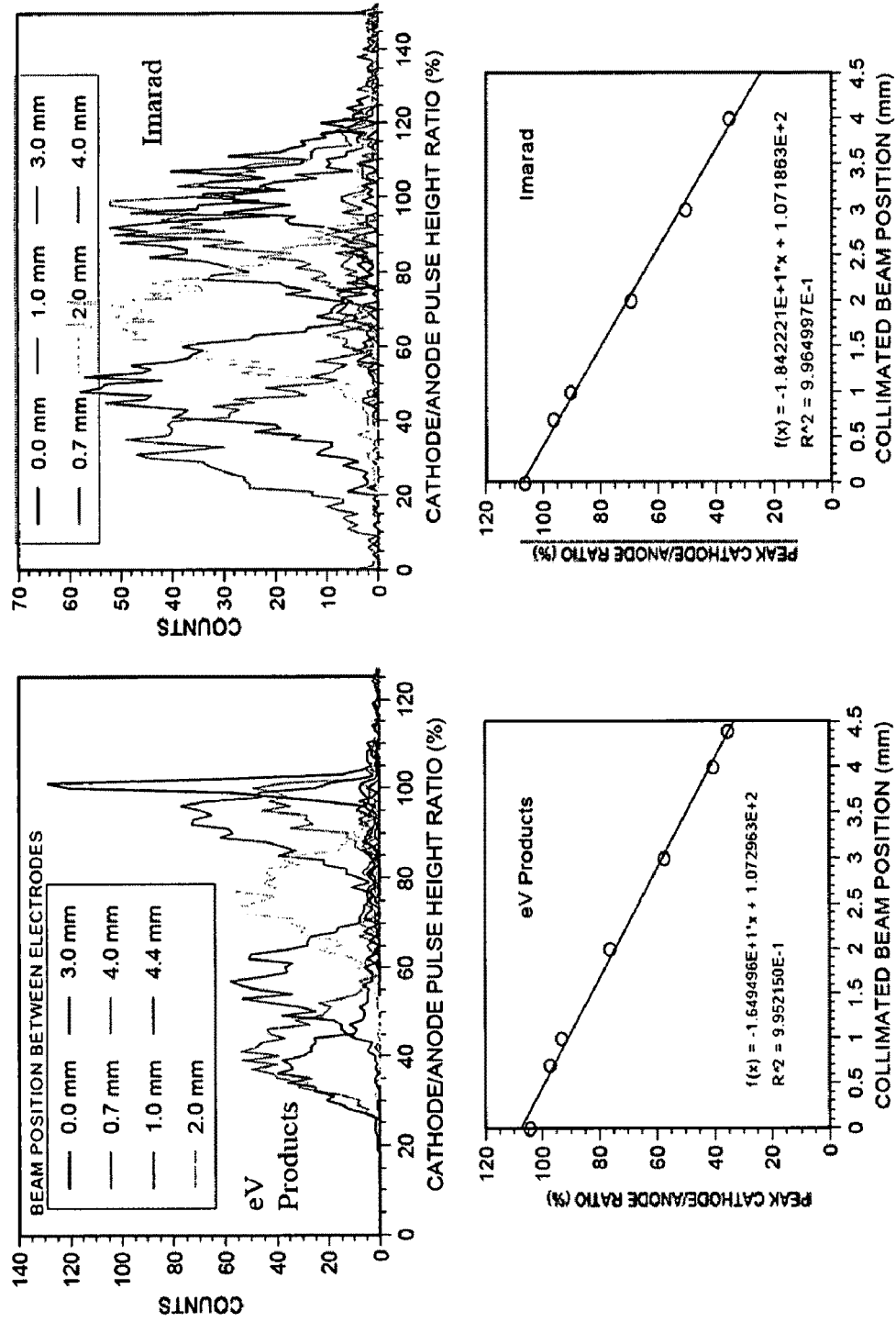
FIGS. 19A-19D show distribution of cathode/anode pulse height ratios for various $^{22}$Na collimated beam positions between the cathode and anode measured with the eV Products pixellated CZT array and the Imarad pixellated CZT array.

To demonstrate an embodiment in which pixellated detectors are irradiated edge-on, FIGS. 17A-17E show the measured raw (uncorrected) energy spectra results from irradiating the edge of the 5 mm thick eV Products array with a collimated beam (0.8 mm beam width) of 511 keV photons at different depths between the cathode and anode of each detector. FIGS. 17F-17J show similar results for the Imarad arrays. FIG. 18 shows the configuration used. Since the pixels are relatively large, there is a significant charge deficit induced on the anode by hole trapping for each event which produces a low energy tailing on the photopeak in the raw (uncorrected) spectra.

In another preferred embodiment, cross-strip CZT detector arrays are oriented edge-on with respect to incoming photons and configured tangentially to form a tomography ring (as shown in FIGS. 13 and 14A-14D). In this arrangement, the axial coordinate of a photon interaction would be determined by the anode strip with the largest signal, the radial coordinate by the corresponding hit cathode strip, and the tangential or transaxial coordinate by the interaction depth between the cathode and anode. The plots in FIGS. 19A-19D demonstrate that positioning interactions in the direction between the cathode and anode may also be accomplished using simply the measured cathode/anode pulse height ratios for each event to achieve tangential spatial resolutions on the order of 1 mm with a high degree of spatial linearity. This edge-on data is shown for the eV Products and Imarad detector arrays.

The spatial, temporal, and spectral information required for preferred detectors will rely upon good quality signals from both the anode and cathode. One can estimate the contribution of leakage current to anode and cathode energy resolution in the proposed cross-strip Imarad detector through measurements on the pixellated Imarad detector. The measured leakage current for the Imarad CZT material per anode is ~1.6 nA at 172 V across the pixellated detector we that was tested (resistivity of 1.3×10$^{10}$ W-cm).

The effective Imarad array pixel size is 2.5 mm×2.5 mm=6.25 mm$^2$. The proposed Imarad material cross-strip array will have a 1 mm×40 mm=40 mm$^2$ anode and a 5 mm×40 mm=200 mm2 cathode. Since the leakage current scales as the strip readout area, the leakage currents for the proposed cross-strip array for the same detector bias would be roughly (40/6.25)×1.6=10 nA per anode strip and (200/6.25)×1.6=50 nA per cathode strip. At a preferred 500V bias, these leakage current values would be roughly 500/172 higher or 29 and 145 nA, respectively per anode and cathode strip. The contribution of these estimated leakage currents in the proposed cross-strip Imarad detector to the energy resolution was estimated by adjusting the bias on the pixellated Imarad array until the measured leakage current at the anode or cathode corresponded to these leakage current values and the noise pulse height resolution was measured for both electrodes. The results of these measurements indicate that the leakage current in the proposed detectors will contribute roughly 2.3% FWHM per anode and 6.0% per cathode strip at 511 keV. Using the measured anode strip resolution of 2.5% FWHM at 511 keV, one expects to achieve an overall 511 keV energy resolution of 3.3 and 6.5% FWHM, respectively for the anode and cathode energy resolutions. The cathode to anode pulse height ratio is used to determine the pulse height and temporal correction factors as well as the interaction depth. These anode and cathode pulse height resolutions propagate to roughly a depth (position between cathode and anode) resolution of 0.6 mm FWHM assuming a point size beam.

Figures 20A, 20B, 20C:
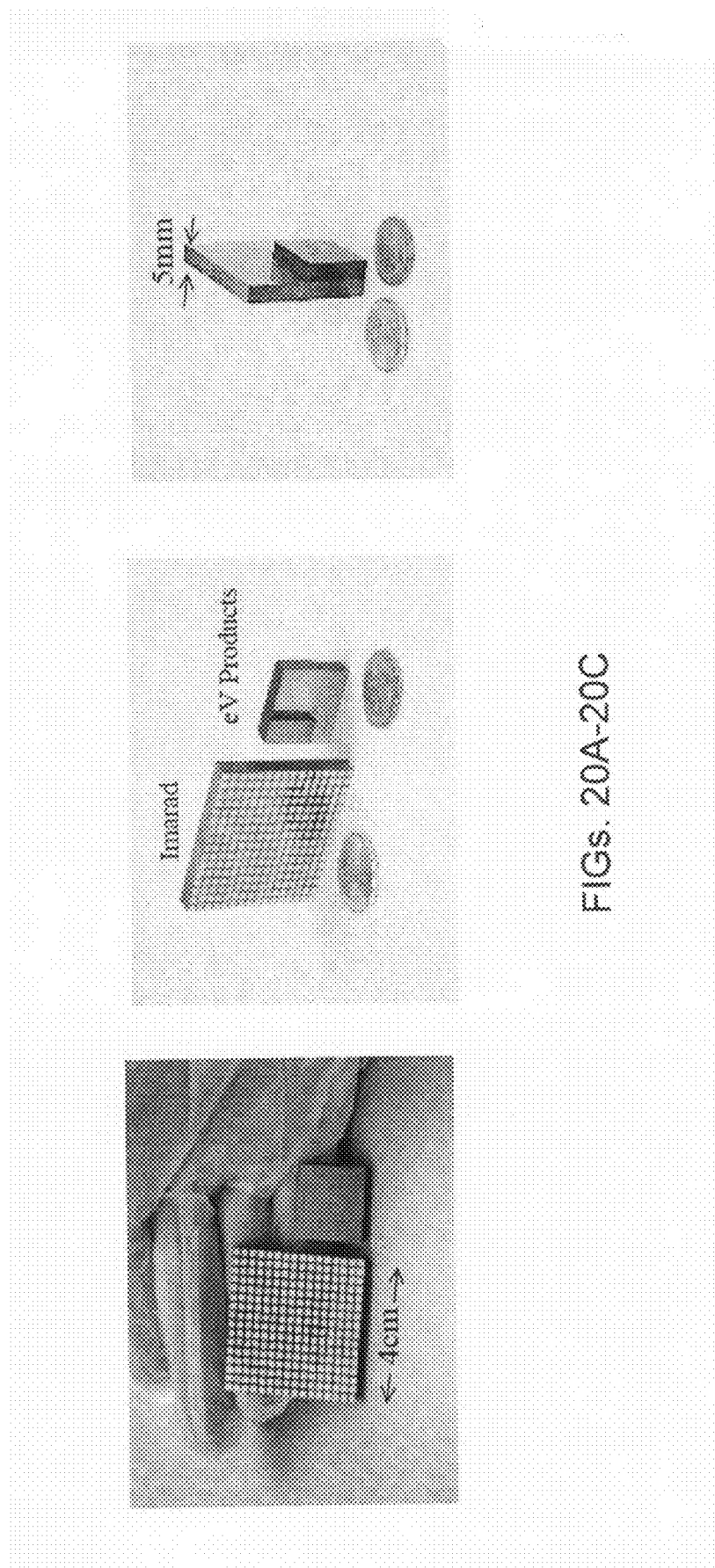
FIGS. 20A-20C show Imarad and eV Products pixellated arrays.

FIGS. 20A-20C show pictures of the 40×40×5 mm$^3$ Imarad and 20×20×5 mm$^3$ eV Products pixellated arrays that were tested. Note that CZT detectors can in principle be placed adjacent to each other and edge-on with respect to incoming photons with essentially no dead area.

While specific embodiments of the present invention have been shown and described, it should be understood that other modifications, substitutions, and alternatives are apparent to one of ordinary skill in the art. Such modifications, substitutions, and alternatives can be made without departing from the spirit and scope of the invention, which should be determined from the appended claims.

Various features of the invention are set forth in the appended claims.

The invention claimed is:

1. A radiation imaging device, comprising:
a subject radiation station producing photon emissions; and
at least one semiconductor crystal detector arranged in an edge-on orientation with respect to the emitted photons to directly receive the emitted photons and produce a signal, said semiconductor crystal detector comprising at least one anode and at least one cathode that produces the signal in response to the emitted photons;
wherein each of said at least one semiconductor crystal detector comprises:
a plate formed from a semiconductor material having opposing large faces;
an array of anode strips disposed on one of the opposing large faces;
an array of cathode strips extending perpendicularly to the array of anodes and disposed on the other large face.

2. The device of claim 1, wherein each of said at least one semiconductor crystal detector comprises a plate formed from a high-z semiconductor.

3. The device of claim 1, wherein each of said at least one semiconductor crystal detector comprises a plate formed by cadmium-zinc-telluride (CZT).

4. The device of claim 1, wherein said at least one semiconductor crystal detector comprises a plurality of stacked semiconductor crystal detectors, each arranged in an edge-on orientation with respect to the emitted photons;
wherein the stacked crystal detectors extend at least partially about the subject radiation station.

5. The device of claim 4, wherein the semiconductor crystal detectors are arranged to form a cylinder extending about the subject radiation station.

6. The device of claim 4, wherein the semiconductor crystal detectors are arranged in a plurality of arcs from a cylindrical tube extending about the subject radiation station.

7. The device of claim 4, wherein the semiconductor crystal detectors are arranged to provide a pair of flat panels disposed on opposing sides of the subject radiation station.

8. The device of claim 1, wherein the device is configured for positron emission tomography.

9. The device of claim 8, wherein said plurality of semiconductor crystal detectors is arranged about said subject radiation station.

10. The device of claim 9, wherein the plurality of semiconductor crystal detectors are stacked to form at least one of a cylinder and an arc from a cylinder disposed about said subject radiation station.

11. The device of claim 9, wherein the plurality of semiconductor crystal detectors are stacked to form a box about said subject radiation station.

12. The device of claim 1, further comprising:
a processor configured to process the signal from said semiconductor crystal detectors and provide at least a position for emitted photons.

13. The device of claim 12, wherein said processor is configured to determine an X-position, a Y-position, and a Z interaction depth for the incoming photons.

14. The device of claim 12, wherein said processor is configured to determine a time signal from a pulse provided by the at least one cathode.

15. A radiation imaging device, comprising:
a subject radiation station producing photon emissions; and
at least one semiconductor crystal detector arranged in an edge-on orientation with respect to the emitted photons to directly receive the emitted photons and produce a signal, said semiconductor crystal detector comprising at least one anode and at least one cathode that produces the signal in response to the emitted photons;
wherein each of said at least one semiconductor crystal detector comprises:
a plate formed from a semiconductor material having opposing large faces;
an array of anode strips disposed on one of the opposing large faces;
an array of cathode strips extending perpendicularly to the array of anodes and disposed on the other large face;
wherein the cathode strips have a width at least equal to that of the anode strips.

16. The device of claim 15, wherein each of said at least one semiconductor crystal detector further comprises steering electrodes disposed to steer a charge created from the directly received photons toward the anode strips.

17. A radiation imaging device, comprising:
a subject radiation station producing photon emissions; and
at least one semiconductor crystal detector arranged in an edge-on orientation with respect to the emitted photons to directly receive the emitted photons and produce a signal, said semiconductor crystal detector comprising at least one anode and at least one cathode that produces the signal in response to the emitted photons;
wherein said at least one semiconductor crystal detector comprises a plurality of stacked semiconductor crystal detectors, each arranged in an edge-on orientation with respect to the emitted photons so that a top edge faces the emitted photons;
each of said at least one semiconductor crystal detectors comprising a semiconductor wafer, the at least one cathode disposed on the wafer, the at least one anode disposed on the wafer, and at least one lead extending from a bottom edge opposing the edge facing the emitted photons.

18. The device of claim 17 wherein each of said semiconductor crystal detectors comprises:
a wafer formed from a semiconductor material having opposing large faces;
an array of anode strips disposed on one of the opposing large faces;
an array of cathode strips extending perpendicularly to the array of anodes and disposed on the other large face;
wherein the at least one lead extends from the anode strips and the cathode strips, respectively.

19. The device of claim 18 further comprising:
an amplifier for amplifying signals from the at least one lead;
a processor for processing the amplified signals.

20. A method for radiation imaging, comprising:
providing a plurality of semiconductor crystal detectors oriented edge-on with respect to a subject radiation station, each of the plurality of semiconductor crystal detectors comprising a semiconductor crystal, at least one anode disposed on a large face of the crystal, and at least one cathode disposed on an opposing large face of the crystal;
directly receiving emitted photons from the subject radiation station by the semiconductor crystal detectors, the semiconductor crystal directly absorbing the emitted photons, the at least one anode and cathode producing electric pulses sufficient to determine a position of the emitted photons;
wherein the electric pulses produced from the at least one anode are sufficient to determine an X-position for the emitted photons, and wherein the electric pulses produced from the at least one cathode are sufficient to determine a Y-position for the emitted photons.

21. The method of claim 20, further comprising:
determining the X-position from the produced anode pulses;
determining the Y-position from the produced cathode pulses.

22. The method of claim 21, further comprising:
determining a Z-position from a ratio of the produced anode pulses and the produced cathode pulses.

23. The method of claim 21, further comprising:
determining a time signal from the produced cathode pulses.

24. The method of claim 23, further comprising:
determining a Z-position from a measured time difference between arriving anode and cathode signals.

25. The method of claim 21, further comprising:
determining interaction depth Z of the incoming photons using at least one of a ratio of the cathode pulses to anode pulses and an arrival time difference between the cathode and anode pulses.

26. The method of claim 21, further comprising:
determining interaction depth Z of the incoming photons;
determining a position of the incoming photons from the subject radiation station using the determined X-position, Y-position, and interaction depth Z.

27. A method for radiation imaging, comprising:
providing a plurality of semiconductor crystal detectors oriented edge-on with respect to a subject radiation station, each of the plurality of semiconductor crystal detectors comprising a semiconductor crystal, at least one anode disposed on a large face of the crystal, and at least one cathode disposed on an opposing large face of the crystal;

directly receiving emitted photons from the subject radiation station by the semiconductor crystal detectors, the semiconductor crystal directly absorbing the emitted photons, the at least one anode and cathode producing electric pulses sufficient to determine a position of the emitted photons;

wherein the electric pulses produced from the at least one anode are sufficient to determine an X-position for the emitted photons, and wherein the electric pulses produced from the at least one cathode are sufficient to determine a Y-position for the emitted photons;

further comprising:

determining the X-position from the produced anode pulses;

determining the Y-position from the produced cathode pulses;

determining a time stamp of a photon interaction with one of the semiconductor crystal detectors;

determining a Z-coordinate of the photon interaction;

correcting a time stamp of the photon interaction by using time dependent properties and the determined Z-coordinate of the interaction.

28. A method for radiation imaging, comprising:

providing a plurality of semiconductor crystal detectors oriented edge-on with respect to a subject radiation station, each of the plurality of semiconductor crystal detectors comprising a semiconductor crystal, at least one anode disposed on a large face of the crystal, and at least one cathode disposed on an opposing large face of the crystal;

directly receiving emitted photons from the subject radiation station by the semiconductor crystal detectors, the semiconductor crystal directly absorbing the emitted photons, the at least one anode and cathode producing electric pulses sufficient to determine a position of the emitted photons;

wherein the electric pulses produced from the at least one anode are sufficient to determine an X-position for the emitted photons, and wherein the electric pulses produced from the at least one cathode are sufficient to determine a Y-position for the emitted photons;

further comprising:

determining the X-position from the produced anode pulses;

determining the Y-position from the produced cathode pulses;

determining a pulse height from the electric pulses produced from the at least one anode;

using the determined anode and cathode signals to correct the determined pulse height to correct for a charge attenuation effect and determine a corrected pulse height.

29. A radiation imaging device, comprising:

a subject radiation station producing photon emissions; and at least one semiconductor crystal detector arranged in an edge-on orientation with respect to the emitted photons to directly receive the emitted photons and produce a signal, said semiconductor crystal detector comprising at least one anode and at least one cathode that produces the signal in response to the emitted photons;

wherein each of said at least one semiconductor crystal detector comprises:

a plate formed from a semiconductor material having opposing large faces;

an array of anode strips disposed on one of the opposing large faces;

an array of cathode strips extending perpendicularly to the array of anodes and disposed on the other large face; and a processor configured to process the signal from said semiconductor crystal detectors and provide at least a position for emitted photons;

wherein said processor is configured to correct the time signal.

30. A radiation imaging device, comprising:

a subject radiation station producing photon emissions; and at least one semiconductor crystal detector arranged in an edge-on orientation with respect to the emitted photons to directly receive the emitted photons and produce a signal, said semiconductor crystal detector comprising at least one anode and at least one cathode that produces the signal in response to the emitted photons;

wherein each of said at least one semiconductor crystal detector comprises:

a plate formed from a semiconductor material having opposing large faces;

an array of anode strips disposed on one of the opposing large faces;

an array of cathode strips extending perpendicularly to the array of anodes and disposed on the other large face; and a processor configured to process the signal from said semiconductor crystal detectors and provide at least a position for emitted photons;

wherein said processor is configured to determine a pulse height from a pulse provided by the at least one anode, and to correct the determined pulse height based on provided cathode and anode pulses.

31. A radiation imaging device, comprising:

a subject radiation station producing photon emissions; and at least one semiconductor crystal detector arranged in an edge-on orientation with respect to the emitted photons to directly receive the emitted photons and produce a signal, said semiconductor crystal detector comprising at least one anode and at least one cathode that produces the signal in response to the emitted photons;

wherein each of said at least one semiconductor crystal detector comprises:

a plate formed from a semiconductor material having opposing large faces;

an array of anode strips disposed on one of the opposing large faces;

an array of cathode strips extending perpendicularly to the array of anodes and disposed on the other large face;

wherein the device is configured for positron emission tomography;

wherein said plurality of semiconductor crystal detectors is arranged about said subject radiation station:

wherein the plurality of semiconductor crystal detectors is stacked with a packing fraction greater than 95%.

32. A radiation imaging device, comprising:

a subject radiation station producing photon emissions; and at least one semiconductor crystal detector arranged in an edge-on orientation with respect to the emitted photons to directly receive the emitted photons and produce a signal, said semiconductor crystal detector comprising at least one anode and at least one cathode that produces the signal in response to the emitted photons;
wherein each of said at least one semiconductor crystal detector comprises:
a plate formed from a semiconductor material having opposing large faces;
an array of anode strips disposed on one of the opposing large faces;
an array of cathode strips extending perpendicularly to the array of anodes and disposed on the other large face;
wherein the device is configured for positron emission tomography;
wherein each of said anode strips has a respective spacing of no more than 1 mm.

33. A radiation imaging device, comprising:
a subject radiation station producing photon emissions; and
at least one semiconductor crystal detector arranged in an edge-on orientation with respect to the emitted photons to directly receive the emitted photons and produce a signal, said semiconductor crystal detector comprising at least one anode and at least one cathode that produces the signal in response to the emitted photons;
wherein each of said at least one semiconductor crystal detector comprises:
a plate formed from a semiconductor material having opposing large faces;
an array of anode strips disposed on one of the opposing large faces;
an array of cathode strips extending perpendicularly to the array of anodes and disposed on the other large face;
wherein the device is configured for positron emission tomography;
wherein each of said cathode strips has a respective spacing of no more than 5 mm.

34. A radiation imaging device, comprising:
a subject radiation station producing photon emissions; and
at least one semiconductor crystal detector arranged in an edge-on orientation with respect to the emitted photons to directly receive the emitted photons and produce a signal, said semiconductor crystal detector comprising at least one anode and at least one cathode that produces the signal in response to the emitted photons;
wherein each of said at least one semiconductor crystal detector comprises:
a plate formed from a semiconductor material having opposing large faces;
an array of anode strips disposed on one of the opposing large faces;
an array of cathode strips extending perpendicularly to the array of anodes and disposed on the other large face;
wherein the device is configured for positron emission tomography;
wherein a minimum effective thickness of each of said at least one semiconductor crystal detector is at least 4 cm.

35. A method for radiation imaging, comprising:
providing a plurality of semiconductor crystal detectors oriented edge-on with respect to a subject radiation station, each of the plurality of semiconductor crystal detectors comprising a semiconductor crystal, at least one anode disposed on a large face of the crystal, and at least one cathode disposed on an opposing large face of the crystal;
directly receiving emitted photons from the subject radiation station by the semiconductor crystal detectors, the semiconductor crystal directly absorbing the emitted photons, the at least one anode and cathode producing electric pulses sufficient to determine a position of the emitted photons;
wherein the electric pulses produced from the at least one anode are sufficient to determine an X-position for the emitted photons, and wherein the electric pulses produced from the at least one cathode are sufficient to determine a Y-position for the emitted photons;
further comprising:
based on said directly received emitted photons, determining that the emitted photons have undergone multiple interactions; and
selecting a first interaction from among one of the multiple interactions.

* * * * *

UNITED STATES PATENT AND TRADEMARK OFFICE
CERTIFICATE OF CORRECTION

PATENT NO. : 8,063,380 B2  
APPLICATION NO. : 11/662870  
DATED : November 22, 2011  
INVENTOR(S) : Levin et al.

Page 1 of 1

It is certified that error appears in the above-identified patent and that said Letters Patent is hereby corrected as shown below:

In the Specification:

Col. 11, line 28    After "CZT," please delete "we arranged"

Col. 16, line 28    Before "1 mm", please insert -- ≤ --

Signed and Sealed this  
Twenty-third Day of July, 2013

Teresa Stanek Rea  
*Acting Director of the United States Patent and Trademark Office*